US012745208B2

(12) United States Patent
Zhang et al.

(10) Patent No.: US 12,745,208 B2
(45) Date of Patent: Sep. 22, 2026

(54) WIRELESS COMMUNICATION METHOD AND TERMINAL DEVICE

(71) Applicant: GUANGDONG OPPO MOBILE TELECOMMUNICATIONS CORP., LTD., Dongguan (CN)

(72) Inventors: Shichang Zhang, Dongguan (CN); Zhenshan Zhao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 266 days.

(21) Appl. No.: 18/680,330

(22) Filed: May 31, 2024

(65) Prior Publication Data

US 2024/0323904 A1 Sep. 26, 2024

Related U.S. Application Data

(63) Continuation of application No. PCT/CN2021/141770, filed on Dec. 27, 2021.

(51) Int. Cl.

| | |
|---|---|
| ***H04L 5/00*** | (2006.01) |
| ***H04W 64/00*** | (2009.01) |
| ***H04W 72/40*** | (2023.01) |
| *H04W 92/18* | (2009.01) |

(52) U.S. Cl.
CPC .......... *H04W 64/00* (2013.01); *H04L 5/0051* (2013.01); *H04W 72/40* (2023.01); *H04W 92/18* (2013.01)

(58) Field of Classification Search
CPC ........ H04L 5/0051; H04L 5/00; H04W 64/00; H04W 72/40; H04W 92/18
See application file for complete search history.

(56) References Cited

U.S. PATENT DOCUMENTS

| | | | | |
|---|---|---|---|---|
| 2020/0280398 | A1* | 9/2020 | Hwang | H04L 1/1887 |
| 2021/0120519 | A1 | 4/2021 | Si et al. | |
| 2022/0231815 | A1* | 7/2022 | Sun | H04L 5/0051 |
| 2023/0047000 | A1* | 2/2023 | Guo | H04W 72/044 |
| 2023/0089655 | A1* | 3/2023 | Yeo | H04L 5/0044 370/329 |

FOREIGN PATENT DOCUMENTS

| | | | |
|---|---|---|---|
| CN | 106303918 | A1 | 1/2017 |
| CN | 111213393 | A1 | 5/2020 |
| CN | 111436131 | A1 | 7/2020 |
| CN | 111656835 | A1 | 9/2020 |

(Continued)

OTHER PUBLICATIONS

International Search Report and Written Opinion of the International Searching Authority regarding International Patent Application No. PCT/CN2021/141770, dated Jul. 1, 2022. Translation provided by WIPO Translate.

(Continued)

*Primary Examiner* — Lan-Huong Truong
(74) *Attorney, Agent, or Firm* — Sheppard, Mullin, Richter & Hampton LLP

(57) ABSTRACT

A wireless communication method includes: transmitting, by a first terminal device, at least one reference signal and at least one sidelink channel to a second terminal device within a first time unit. The at least one reference signal is used for the absolute positioning and/or relative positioning.

20 Claims, 10 Drawing Sheets

200

First terminal device

Second terminal device

S210, the first terminal device transmits at least one reference signal and at least one sidelink channel to the second terminal device within the first time unit, and the at least one reference signal is used for absolute positioning and/or relative positioning S220, the second terminal device receives the at least one reference signal and the at least one sidelink channel transmitted by the first terminal device within the first time unit

(56) References Cited

FOREIGN PATENT DOCUMENTS

| | | | | | |
|---|---|---|---|---|---|
| CN | 113258972 | A | 8/2021 | | |
| CN | 115706627 | A | 2/2023 | | |
| WO | 2020246842 | A1 | 12/2020 | | |
| WO | 2021112610 | A1 | 6/2021 | | |
| WO | WO-2023102283 | A1 * | 6/2023 | ........... | G01S 5/0268 |

OTHER PUBLICATIONS

3rd Generation Partnership Project;Technical Specification Group Radio Access Network;NR;Physical layer procedures for data (Release 16) 3GPP TS 38.214 V16.7.0 (Sep. 2021).

3rd Generation Partnership Project;Technical Specification Group Radio Access Network;NR;Radio Resource Control (RRC) protocol specification(Release 16);3GPP TS 38.331 V16.6.0 (Sep. 2021).

* cited by examiner

Sidelink start sidelink symbol
Sidelink length sidelink symbols
0 1 2 3 4 5 6 7 8 9 10 11 12 13
Frequency
Time
PSCCH
PSSCH
PSFCH
GP
Symbols not usable for sidelink

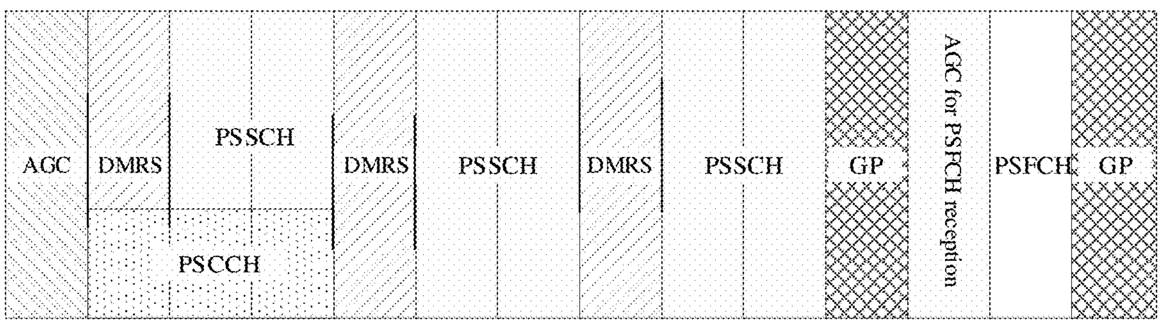
FIG. 11
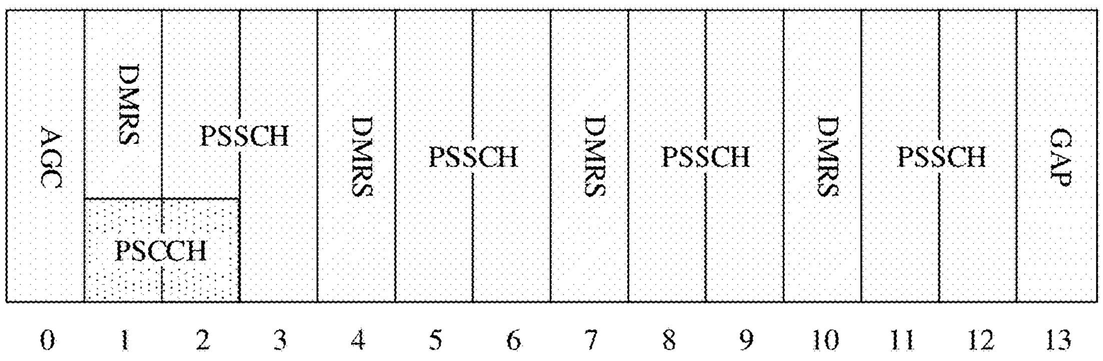
FIG. 12
FIG. 13

200

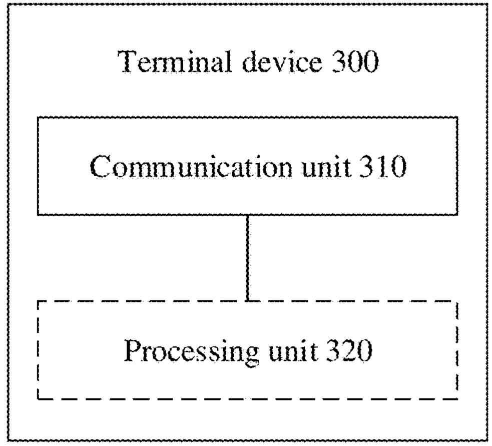
FIG. 19
Terminal device 400
Communication unit 410
FIG. 20
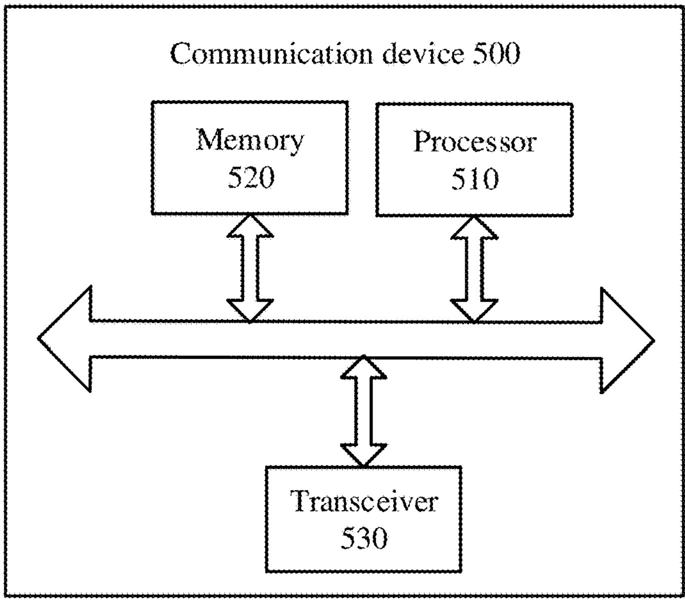
FIG. 21

WIRELESS COMMUNICATION METHOD AND TERMINAL DEVICE

CROSS-REFERENCE TO RELATED APPLICATION

This application is a Bypass Continuation Application of PCT/CN2021/141770 filed Dec. 27, 2021, which is incorporated herein by reference in its entirety.

TECHNICAL FIELD

The embodiments of the present disclosure relate to the field of communication, and more specifically, to a wireless communication method and a terminal device.

BACKGROUND

In sidelink communication, effective positioning reference signals are required to be transmitted on a sidelink in order to achieve sidelink-based positioning. However, a sidelink channel transmitted by a terminal device may also exist on the sidelink. In this case, how to transmit the positioning reference signals becomes a problem that needs to be solved.

SUMMARY

In a first aspect, a wireless communication method is provided, which includes:

transmitting, by a first terminal device, at least one reference signal and at least one sidelink channel to a second terminal device within a first time unit, where the at least one reference signal is used for absolute positioning and/or relative positioning.

In a second aspect, a wireless communication method is provided, which includes:

receiving, by a second terminal device, at least one reference signal and at least one sidelink channel transmitted by a first terminal device within a first time unit, where the at least one reference signal is used for absolute positioning and/or relative positioning.

In a third aspect, a terminal device is provided, which is configured to perform the method according to the first aspect.

Specifically, the terminal device includes a functional module configured to perform the method according to the first aspect.

In a fourth aspect, a terminal device is provided, which is configured to perform the method according to the second aspect.

Specifically, the terminal device includes a functional module configured to perform the method according to the second aspect.

In a fifth aspect, a terminal device is provided, which includes a processor and a memory. The memory is configured to store a computer program. The processor is configured to call and run the computer program stored in the memory to perform the method according to the first aspect.

In a sixth aspect, a terminal device is provided, which includes a processor and a memory. The memory is configured to store a computer program. The processor is configured to call and run the computer program stored in the memory to perform the method according to the second aspect.

In a seventh aspect, an apparatus is provided, which is configured to implement the method according to any one of the above first and second aspects.

Specifically, the apparatus includes a processor, that is configured to call and run a computer program from a memory to cause a device equipped with the apparatus to perform the method according to any one of the above first and second aspects.

In an eighth aspect, a non-transitory computer-readable storage medium is provided, which is configured to store a computer program that causes a computer to perform the method according to any one of the above first and second aspects.

In a ninth aspect, a computer program product is provided, which includes computer program instructions. The computer program instructions cause a computer to perform the method according to any one of the above first and second aspects.

In a tenth aspect, a computer program is provided. When executed on a computer, the computer program causes the computer to perform the method according to any one of the above first and second aspects.

BRIEF DESCRIPTION OF THE DRAWINGS

FIG. 11 is a schematic diagram of a structure of a time slot for PSCCH and PSSCH, in accordance with the present disclosure;

FIG. 12 is a schematic diagram of time-domain positions of 4 DMRS symbols in a case of 13 PSSCH symbols, in accordance with the present disclosure;

FIG. 13 is a schematic diagram of frequency-domain positions of DMRSs on PSSCH (PSSCH DMRSs), in accordance with the present disclosure;

FIG. 19 is a schematic block diagram of a terminal device, in accordance with an embodiment of the present disclosure;

FIG. 20 is a schematic block diagram of another terminal device, in accordance with an embodiment of the present disclosure;

FIG. 21 is a schematic block diagram of a communication device, in accordance with an embodiment of the present disclosure;

DETAILED DESCRIPTION

Figure 1:
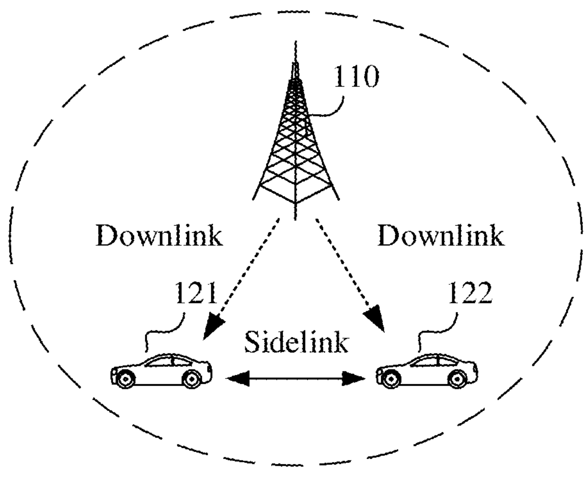
FIG. 1 is a schematic diagram of an architecture of a communication system, in accordance with the present disclosure.

Technical solutions in the embodiments of the present disclosure will be described below with reference to the accompanying drawings in the embodiments of the present disclosure. It is apparent that the embodiments described are some rather than all of the embodiments of the present disclosure. Based on the embodiments of the present disclosure, all other embodiments obtained by a person of ordinary skill in the art fall within the protection scope of the present disclosure.

Technical solutions according to embodiments of the present disclosure may be applied to various communication systems, such as a global system of mobile communication (GSM) system, a code division multiple access (CDMA) system, a wideband code division multiple access (WCDMA) system, a general packet radio service (GPRS), a long term evolution (LTE) system, an advanced long term evolution (LTE-A) system, a new radio (NR) system, an evolution system of the NR system, an LTE-based access to unlicensed spectrum (LTE-U) system, an NR-based access to unlicensed spectrum (NR-U) system, a non-terrestrial networks (NTN) system, a universal mobile telecommunications system (UMTS), a wireless local area network (WLAN), an internet of things (IoT), wireless fidelity (Wi-Fi), a 5th-Generation (5G) communication system, and other communication systems.

Generally, traditional communication systems support a limited quantity of connections, and are easy to implement. However, with the development of communication technology, mobile communication systems will not only support traditional communication, but also support, for example, device to device (D2D) communication, machine to machine (M2M) communication, machine type communication (MTC), vehicle to vehicle (V2V) communication, and vehicle to everything (V2X) communication, and the embodiments of the present disclosure may be applied to these communication systems as well.

Optionally, the communication systems in the embodiments of the present disclosure may be applied to a carrier aggregation (CA) scenario, a dual connectivity (DC) scenario, or a standalone (SA) networking scenario.

Optionally, the communication systems in the embodiments of the present disclosure may be applied to an unlicensed spectrum, which may also be considered as a shared spectrum. The communication systems in the embodiments of the present disclosure may also be applied to a licensed spectrum, which may also be considered as a unshared spectrum.

Various embodiments of the present disclosure are described in combination with a network device and a terminal device. The terminal device may also be referred to as a user equipment (UE), an access terminal, a subscriber unit, a subscriber station, a mobile station, a mobile platform, a remote station, a remote terminal, a mobile device, a user terminal, a terminal, a wireless communication device, a user agent or a user apparatus.

The terminal device may be a station (ST) in the WLAN, or may be a cellular phone, a wireless phone, a session initiation protocol (SIP) phone, a wireless local loop (WLL) station, a personal digital assistant (PDA) device, a handheld device with a wireless communication function, a computing device or another processing device connected to a wireless modem, a vehicle-mounted device, a wearable device, a terminal device in a next generation communication system (e.g., an NR network), or a terminal device in a future evolved public land mobile network (PLMN).

In an embodiment of the present disclosure, the terminal device may be deployed on land including indoor or outdoor, handheld, wearable or vehicle-mounted; alternatively, the terminal device may be deployed on water (such as on ships); alternatively, the terminal device may be deployed aerially (such as in airplanes, balloons and satellites).

In an embodiment of the present disclosure, the terminal device may be a mobile phone, a Pad, a computer with wireless transceiving function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, a wireless terminal device in smart home, a vehicle-mounted communication device, a wireless communication chip/application-specific integrated circuit (ASIC)/system on chip (SoC), or the like.

As an example rather than limitation, the terminal device in the embodiments of the present disclosure may be a wearable device. The wearable device may also be referred to as a wearable smart device, which is a general term of wearable devices developed by intelligent design on daily wear by applying wearable technology, such as glasses, gloves, a watch, clothing and shoes. The wearable device is a portable device that is worn directly on a body, or integrated into clothes or accessories of users. The wearable device not only is a hardware device, but also implements powerful functions through software support as well as data interaction or cloud interaction. Generalized wearable smart devices include devices which are fully functional, have large sizes, and may implement complete or partial functions without relying on smart phones, such as a smart watch or smart glasses, and devices which focus on a certain kind of application functions only and need to be used in conjunction with other devices such as smart phones, such as various smart bracelets, and smart jewelries for monitoring physical signs.

In an embodiment of the present disclosure, the network device may be a device configured to communicate with a mobile device, and may be an access point (AP) in the WLAN, a base transceiver station (BTS) in GSM or CDMA, a NodeB (NB) in WCDMA, an evolutional node B (eNB or eNodeB) in LTE, a relay station, an access point, a vehicle-mounted device, a wearable device, a network device or a gNB in an NR network, a network device in the future evolved PLMN network, or a network device in an NTN network.

As an example rather than limitation, the network device in an embodiment of present disclosure may be of mobility. For example, the network device may be a mobile device. Optionally, the network device may be a satellite, or a balloon station. For example, the satellite may be a low earth orbit (LEO) satellite, a medium earth orbit (MEO) satellite, a geostationary earth orbit (GEO) satellite, a high elliptical orbit (HEO) satellite, or the like. Optionally, the network device may be a base station disposed in a position on land or in a water region.

In an embodiment of the present disclosure, the network device may provide a service for a cell, and the terminal device communicates with the network device through a transmission resource (e.g., a frequency-domain resource, which is also referred to as a spectrum resource) used by the cell. The cell may be a cell corresponding to the network device (e.g., a base station), and the cell may belong to a macro base station, or may belong to a base station corresponding to a small cell. Small cells herein may include a metro cell, a micro cell, a pico cell, a femto cell, and the like. These small cells are characterized by a small coverage range and a low transmission power, and are suitable for providing high-speed data transmission services.

It should be understood that the terms “system” and “network” are often used interchangeably herein. The term “and/or” herein refers to an association relationship describing associated objects only, which indicates that there may be three kinds of relationships. For example, “A and/or B” may indicate three cases that: A exists alone, both A and B exist, and B exists alone. In addition, the symbol “/” herein generally indicates that associated objects before and after this symbol have an “or” relationship.

Terminologies used in the detailed description of the present disclosure are only for the purpose of explaining specific embodiments of the present disclosure, and are not intended to limit the present disclosure. Terms “first”, “second”, “third”, “fourth”, and the like in the specification, claims and drawings of the present disclosure are used to distinguish different objects and not used to describe a specific order. In addition, terms “include” and “have” and any variations thereof are intended to cover non-exclusive inclusion.

It should be understood that “indication” involved in embodiments of the present disclosure may be a direct indication, may be an indirect indication, or may represent an association relationship. As an example, that A indicates B may mean that A indicates B directly, for example, B can be acquired through A; or it may mean that A indicates B indirectly, for example, A indicates C, and B can be acquired through C; or it may mean that there is an association between A and B.

In the description of the embodiments of the present disclosure, the term “correspond” may mean that there is a directly corresponding or an indirectly corresponding relationship between two parties, or mean that there is an association between two parties, or mean a relationship such as indicating and being indicated, or configuring and being configured.

In embodiments of the present disclosure, “pre-defined” or “pre-configured” may be achieved by pre-storing a corresponding code, a table, or other modes that may be used to indicate related information in a device (e.g., including the terminal device and the network device), and its specific implementation is not limited in the present disclosure. For example, pre-defined may refer to what is defined in a protocol.

In an embodiment of the present disclosure, the “protocol” may refer to a standard protocol in the communication field, for example, may include an LTE protocol, an NR protocol, and a related protocol applied in a future communication system, which are not limited in the present disclosure.

The present disclosure provides a wireless communication method applicable to a first terminal device, which includes:

transmitting, by a first terminal device, at least one reference signal and at least one sidelink channel to a second terminal device within a first time unit, where the at least one reference signal is used for absolute positioning and/or relative positioning.

Optionally, the at least one sidelink channel includes at least a PSSCH, and the at least one reference signal includes $M_1$ first-type reference signals and $M_2$ second-type reference signals, $M_1$ and $M_2$ being both positive integers. The $M_1$ first-type reference signals are DMRSs transmitted on the PSSCH, and the $M_2$ second-type reference signals are positioning reference signals (PRSs) transmitted within a time-frequency range of the PSSCH.

Optionally, the $M_2$ second-type reference signals are transmitted on orthogonal frequency division multiplexing (OFDM) symbols adjacent to one or more DMRS symbols of the PSSCH.

Optionally, a PRS and a DMRS that are transmitted on adjacent symbols occupy different resource elements (REs).

Optionally, a DMRS sequence and a PRS sequence that are transmitted on adjacent symbols are the same.

Optionally, the $M_2$ reference signals are transmitted on K OFDM symbols, the K OFDM symbols are obtained by adjusting positions of REs occupied by DMRSs on the K DMRS symbols, and the K DMRS symbols are different from DMRS symbols occupied by the $M_1$ first-type reference signals, K being a positive integer.

Optionally, the DMRSs transmitted on the K DMRS symbols are not used for channel sensing; and/or, DMRSs transmitted on the physical sidelink control channel (PSCCH) in the first time unit are used for the channel sensing.

Optionally, the $M_2$ second-type reference signals are transmitted by using REs that are not occupied by DMRS in DMRS symbols occupied by the $M_1$ first-type reference signals.

Optionally, a DMRS sequence and a PRS sequence that are transmitted on the same DMRS symbol are the same.

Optionally, the method further includes:

in a case of performing rate matching on the PSSCH, ignoring, by the first terminal device, a quantity of REs occupied by the $M_2$ second-type reference signals; and/or, in a case of performing resource mapping on modulation symbols of the PSSCH, puncturing, by the first terminal device, modulation symbols of the PSSCH that are mapped to the REs occupied by the $M_2$ second-type reference signals.

Optionally, the at least one sidelink channel includes at least a PSSCH, and the at least one reference signal includes $M_3$ third-type reference signals and $M_4$ fourth-type reference signals, $M_3$ and $M_4$ being both positive integers. The $M_3$ third-type reference signals are DMRSs transmitted on the PSSCH, and the $M_4$ fourth-type reference signals are PRS transmitted out of a time-frequency range of the PSSCH.

Optionally, the $M_4$ fourth-type reference signals are transmitted on a first OFDM symbol used for sidelink in the first time unit.

Optionally, the $M_4$ fourth-type reference signals are transmitted by using REs at odd positions on the first OFDM symbol used for the sidelink in the first time unit, or the $M_4$ fourth-type reference signals are transmitted by using REs at even positions on the first OFDM symbol used for the sidelink in the first time unit.

Optionally, the $M_4$ fourth-type reference signals are transmitted on second resources in the first time unit. The second resources are distributed in at least one OFDM symbol in the first time unit with a first period.

Optionally, the at least one OFDM symbol does not overlap with OFDM symbols used for sidelink transmission in the first time unit, or the at least one OFDM symbol overlaps with at most one of the OFDM symbols that are used for the sidelink transmission in the first time unit.

Optionally, an index of a first OFDM symbol used for PRS transmission in the first time unit is not greater than an index of a first OFDM symbol used for sidelink in the first time unit.

Optionally, the first period is defined in a protocol, pre-configured, or configured by a network device; and/or the at least one OFDM symbol is defined in a protocol, pre-configured, or configured by a network device.

Optionally, in a case where no transmission resources dedicated to PRS are configured in a second time unit in a resource pool, PSCCH and/or PSSCH are allowed to be transmitted on a OFDM symbol that is configured in the second time unit and usable for PRS transmission.

Optionally, the PSSCH satisfies at least one of following that:

- a channel bandwidth occupied by the PSSCH is not less than W;
- the PSSCH is transmitted periodically;
- the PSSCH is transmitted periodically, and a quantity of transmissions of the PSSCH in each period is not less than N;
- the PSSCH is transmitted in a mode of selecting resources in a resource pool, and a value of a sidelink resource reselection counter is not less than C; or
- the PSSCH is transmitted on authorized resources configured by a network device.
- where W, N, and C are all positive integers, and values of W, N, and C are defined in a protocol, pre-configured, or configured by a network device.

The present disclosure provides a wireless communication method applicable to a second terminal device, which includes:

- receiving, by a second terminal device, at least one reference signal and at least one sidelink channel transmitted by a first terminal device within a first time unit; where the at least one reference signal is used for absolute positioning and/or relative positioning.

Optionally, the method further includes:

- receiving, by the second terminal device, redundant information transmitted by the first terminal device on a first resource in the first time unit.

Optionally, the redundant information is transmitted by the first terminal device in a case where a volume of data to be transmitted within the first time unit is less than a preset value.

Optionally, the first resource is determined by the first terminal device based on a transmission requirement of the at least one reference signal.

Optionally, a value range of frequency-domain resources occupied by the at least one reference signal is defined in a protocol, pre-configured, or configured by a network device; and/or,

- a value range of transmission periods corresponding to the at least one reference signal is defined in a protocol, pre-configured, or configured by a network device; and/or,
- a value range of a quantity of transmissions of a reference signal within each of the transmission periods corresponding to the at least one reference signal is defined in a protocol, pre-configured, or configured by a network device.

Optionally, the at least one sidelink channel includes at least a physical sidelink shared channel (PSSCH), and the at least one reference signal is a demodulation reference signal (DMRS) transmitted on the PSSCH.

Optionally, the at least one sidelink channel includes at least a PSSCH, and the at least one reference signal includes $M_1$ first-type reference signals and $M_2$ second-type reference signals, $M_1$ and $M_2$ being both positive integers. The $M_1$ first-type reference signals are DMRSs transmitted on the PSSCH, and the $M_2$ second-type reference signals are positioning reference signals (PRSs) transmitted within a time-frequency range of the PSSCH.

Optionally, the $M_2$ second-type reference signals are transmitted on orthogonal frequency division multiplexing (OFDM) symbols adjacent to one or more DMRS symbols of the PSSCH.

Optionally, a PRS and a DMRS that are transmitted on adjacent symbols occupy different resource elements (REs).

Optionally, a DMRS sequence and a PRS sequence that are transmitted on adjacent symbols are same.

Optionally, the $M_2$ reference signals are transmitted on K OFDM symbols, and the K OFDM symbols are obtained by adjusting positions of REs occupied by DMRSs on the K DMRS symbols, and the K DMRS symbols are different from DMRS symbols occupied by the $M_1$ first-type reference signals, K being a positive integer.

Optionally, the DMRSs transmitted on the K DMRS symbols are not used for channel sensing; and/or, DMRSs transmitted on the physical sidelink control channel (PSCCH) in the first time unit are used for the channel sensing.

Optionally, the $M_2$ second-type reference signals are transmitted by using REs that are not occupied by DMRS in DMRS symbols occupied by the $M_1$ first-type reference signals.

Optionally, a DMRS sequence and a PRS sequence that are transmitted on a same DMRS symbol are same.

Optionally, in a case where rate matching is performed on the PSSCH, a quantity of REs occupied by the $M_2$ second-type reference signals is ignored; and/or,

- in a case where resource mapping on modulation symbols of the PSSCH is performed, modulation symbols of the PSSCH that are mapped to the REs occupied by the $M_2$ second-type reference signals are punctured.

Optionally, the at least one sidelink channel includes at least a PSSCH, and the at least one reference signal includes $M_3$ third-type reference signals and $M_4$ fourth-type reference signals, $M_3$ and $M_4$ being both positive integers. The $M_3$ third-type reference signals are DMRSs transmitted on the PSSCH, and the $M_4$ fourth-type reference signals are PRS transmitted out of a time-frequency range of the PSSCH.

Optionally, the $M_4$ fourth-type reference signals are transmitted on a first OFDM symbol used for sidelink in the first time unit.

Optionally, the $M_4$ fourth-type reference signals are transmitted by using REs at odd positions on the first OFDM symbol used for the sidelink in the first time unit, or the $M_4$ fourth-type reference signals are transmitted by using REs at even positions on the first OFDM symbol used for the sidelink in the first time unit.

Optionally, the $M_4$ fourth-type reference signals are transmitted on second resources in the first time unit. The second resources are distributed in at least one OFDM symbol in the first time unit with a first period.

Optionally, the at least one OFDM symbol does not overlap with OFDM symbols used for sidelink transmission in the first time unit, or the at least one OFDM symbol overlaps with at most one of the OFDM symbols that are used for the sidelink transmission in the first time unit.

Optionally, an index of a first OFDM symbol used for PRS transmission in the first time unit is not greater than an index of a first OFDM symbol used for sidelink in the first time unit.

Optionally, the first period is defined in a protocol, pre-configured, or configured by a network device; and/or the at least one OFDM symbol is defined in a protocol, pre-configured, or configured by a network device.

Optionally, in a case where no transmission resources dedicated to PRS are configured in a second time unit in a resource pool, PSCCH and/or PSSCH are allowed to be transmitted on a OFDM symbol that is configured in the second time unit and usable for PRS transmission.

Optionally, the PSSCH satisfies at least one of following that:

- a channel bandwidth occupied by the PSSCH is not less than W;
- the PSSCH is transmitted periodically;
- the PSSCH is transmitted periodically, and a quantity of transmissions of the PSSCH in each period is not less than N;
- the PSSCH is transmitted in a mode of selecting resources in a resource pool, and a value of a sidelink resource reselection counter is not less than C; or
- the PSSCH is transmitted on authorized resources configured by a network device;
- where W, N, and C are all positive integers, and values of W, N, and C are defined in a protocol, pre-configured, or configured by a network device.

Optionally, the PSSCH carries first indication information, or a PSCCH used to schedule the PSSCH carries the first indication information; where the first indication information is used to indicate that the at least one reference signal is used for the absolute positioning and/or the relative positioning.

Optionally, the at least one sidelink channel includes at least one of following: a PSSCH, a PSCCH, or a physical sidelink feedback channel (PSFCH).

Optionally, the time unit is a time slot or a subframe.

In order to facilitate understanding of the technical solutions of the embodiments of the present disclosure, the technical solutions of the present disclosure will be described in detail in the following through specific embodiments. The following related technologies, as optional solutions, can be arbitrarily combined with the technical solutions of the embodiments of the present disclosure, and these combined solutions all fall within the protection scope of the embodiments of the present disclosure. The embodiments of the present disclosure include at least part of the following contents.

FIG. 1 is a schematic diagram of a communication system to which the embodiments of the present disclosure apply. Transmission resources of vehicle-mounted terminals (a vehicle-mounted terminal 121 and a vehicle-mounted terminal 122) are allocated by a base station 110, and the vehicle-mounted terminals transmit data on a sidelink (SL) according to the resources allocated by the base station 110. Specifically, the base station 110 may allocate resources for single transmission to the terminals, or may allocate resources for semi-static transmission to the terminals.

Figure 2:
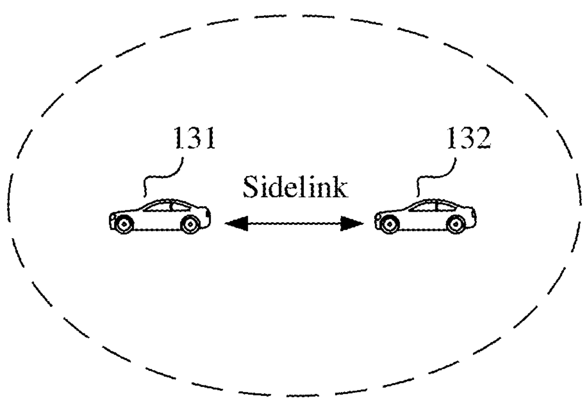
FIG. 2 is a schematic diagram of an architecture of another communication system, in accordance with the present disclosure.

FIG. 2 is a schematic diagram of another communication system to which the embodiments of the present disclosure apply. Vehicle-mounted terminals (a vehicle-mounted terminal 131 and a vehicle-mounted terminal 132) autonomously select transmission resources from resources for sidelink to perform data transmission. Optionally, the vehicle-mounted terminals may select the transmission resources randomly or select the transmission resources by sensing.

Figure 3:
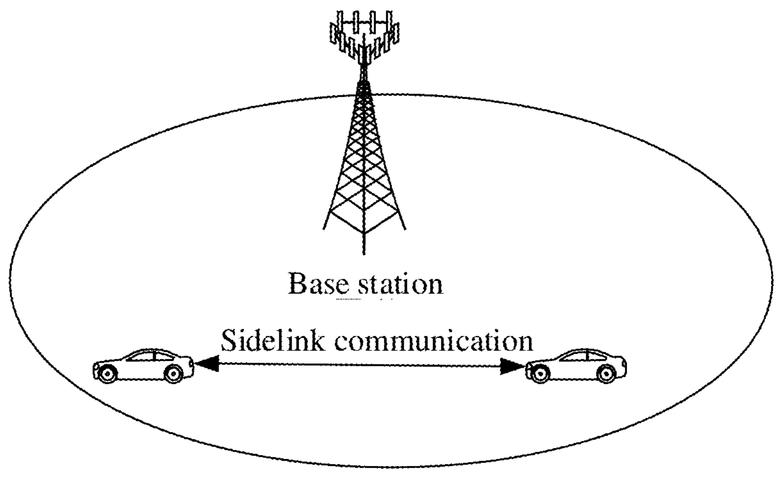
FIG. 3 is a schematic diagram showing sidelink communication within network coverage, in accordance with the present disclosure.
Figure 4:
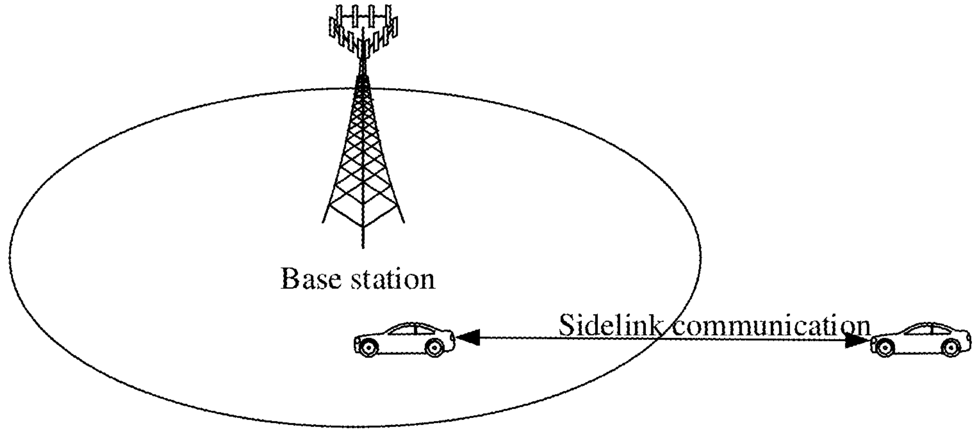
FIG. 4 is a schematic diagram showing sidelink communication within partial network coverage, in accordance with the present disclosure.
Figure 5:
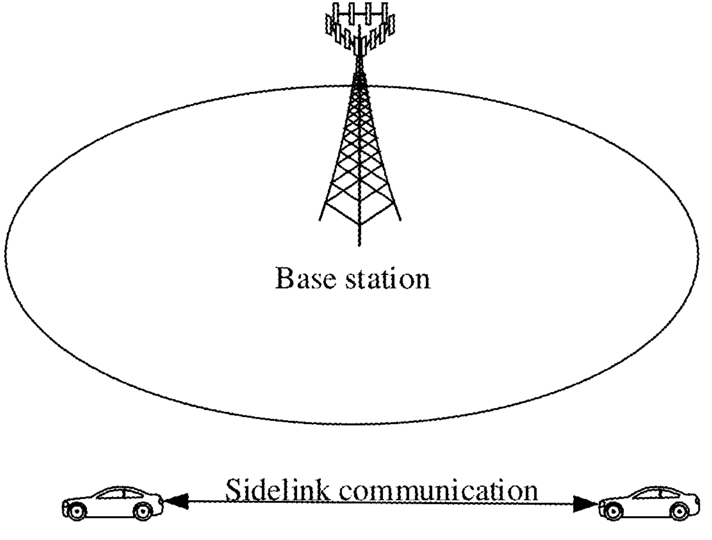
FIG. 5 is a schematic diagram showing sidelink communication out of network coverage, in accordance with the present disclosure.

It should be noted that depending on network coverage of the terminals in communicating, sidelink communication may be categorized into a sidelink communication within network coverage as shown in FIG. 3, a sidelink communication in partial network coverage as shown in FIG. 4, and sidelink communication out of network coverage as shown in FIG. 5.

In FIG. 3, in the sidelink communication within network coverage, all terminals performing sidelink communication are within the coverage of the base station. Therefore, the terminals can receive configuration signaling from the base station, and perform the sidelink communication based on the same sidelink configuration.

In FIG. 4, in a case of the sidelink communication within partial network coverage, some of the terminals performing sidelink communication are located within the coverage of the base station. These terminals can receive configuration signaling from the base station, and perform the sidelink communication according to a configuration of the base station. Terminals located out of the network coverage cannot receive the configuration signaling from the base station. In this case, the terminals located out of the network coverage will determine sidelink configuration according to pre-configuration information and information carried in a physical sidelink broadcast channel (PSBCH), to perform the sidelink communication.

In FIG. 5, in the sidelink communication out of network coverage, all the terminals performing sidelink communication are located out of the network coverage, and all the terminals determine sidelink configuration according to pre-configuration information, to perform the sidelink communication.

Figure 6:
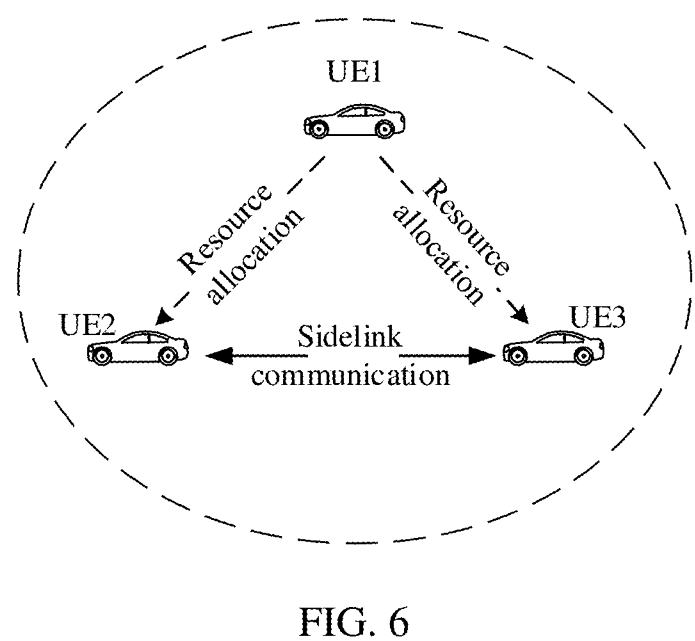
FIG. 6 is a schematic diagram showing sidelink communication with a central control node, in accordance with the present disclosure.

In FIG. 6, in sidelink communication with a central control node, multiple terminals form a communication group. The communication group has a central control node, which may also be called a cluster head (CH) terminal. The central control node has one of the following functions: responsible for an establishment of communication groups; reception and release of the group members; coordinating resources, allocating sidelink transmission resources to other terminals, and receiving sidelink feedback information from other terminals; or coordinating resources with other communication groups.

It should be noted that device-to-device communication is a sidelink transmission technology based on terminal-to-terminal. Unlike a way communication data is received or transmitted via base stations in traditional cellular systems, a vehicle-to-everything system adopts direct terminal-to-terminal communication, resulting in higher spectrum efficiency and lower transmission delay. There are two transmission modes defined in the 3rd Generation Partnership Project (3GPP), which are referred to as a first mode (sidelink resource allocation mode 1) and a second mode (sidelink resource allocation mode 2).

In the first mode, transmission resources of a terminal are allocated by the base station, and the terminal transmits data on the sidelink according to the resources allocated by the base station; and the base station can allocate resources for single transmission to the terminal, or can allocate semi-static transmission to the terminal. As shown in FIG. 3, the terminal is located within the network coverage, and the network allocates transmission resources for sidelink transmission to the terminal.

In the second mode, a terminal selects resources in a resource pool to perform data transmission. As shown in FIG. 5, the terminal is located out of the coverage of a cell, and the terminal autonomously selects transmission resources in a pre-configured resource pool to perform sidelink transmission. Alternatively, as shown in FIG. 3, the terminal autonomously selects transmission resources in a resource pool configured by the network to perform sidelink transmission.

In some embodiments, resource selection in the second mode is performed in the following two steps.

In step 1, the terminal takes all available resources in a resource selection window as a resource set A.

If the terminal transmits data in some time slots within a sensing window and does not perform sensing, all resources in time slots corresponding to these time slots within the selection window are excluded. The terminal uses a value set of a "resource reservation period" field in all resource pool configuration to determine corresponding time slots within the selection window.

If the terminal has sensed a physical sidelink control channel (PSCCH) within the sensing window, the terminal measures reference signal received power (RSRP) of the PSCCH or RSRP of a physical sidelink shared channel (PSSCH) scheduled by the PSCCH. If the measured RSRP is greater than a sidelink RSRP (SL-RSRP) threshold, and it is determined, according to resource reservation information in the sidelink control information transmitted on the PSCCH, that the reserved resources are located in the selection window, then corresponding resources are excluded from the set A. If the remaining resources in the resource set A are less than X % of all resources in the resource set A before resource exclusion, the SL-RSRP threshold is increase by 3 decibels (dB) and the terminal re-performs step 1. The possible values of the above X are in a value set {20, 35, 50}, and the terminal determines the parameter X from the value set according to a priority of data to be transmitted. In addition, the above-mentioned SL-RSRP threshold is related to a priority carried in the PSCCH sensed by the terminal and the priority of the data to be transmitted by the terminal. The terminal takes the remaining resources in the set A after the resource exclusion as a candidate resource set.

In step 2, the terminal randomly selects several resources from the candidate resource set as transmitting resources for its initial transmission and re-transmission.

Autonomous driving is supported in new radio-vehicle to everything (NR-V2X), which puts forward higher requirements for data communication between vehicles, for example, higher throughput, lower latency, higher reliability, larger coverage, and more flexible resource allocation.

Figure 7:
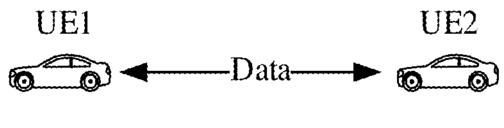
FIG. 7 is a schematic diagram showing unicast sidelink communication, in accordance with the present disclosure.
Figure 8:
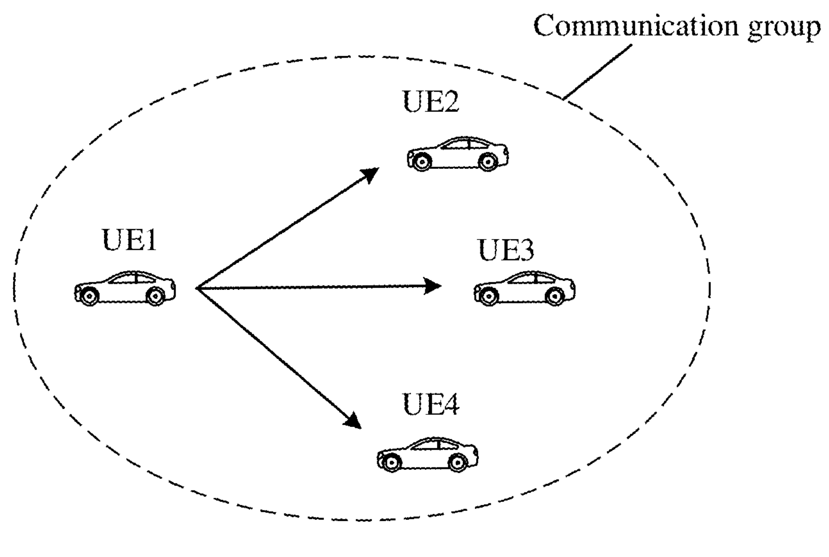
FIG. 8 is a schematic diagram showing multicast sidelink communication, in accordance with the present disclosure.
Figures 9, 10:
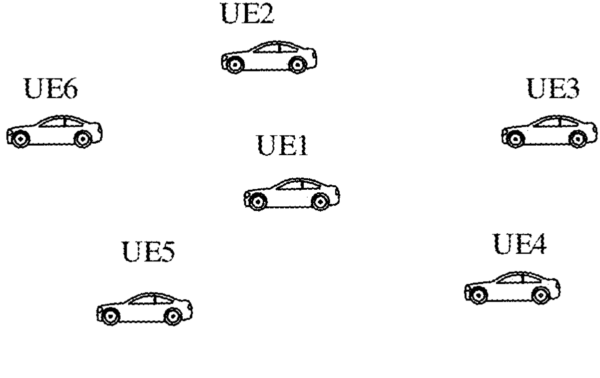
FIG. 9 is a schematic diagram showing broadcast sidelink communication, in accordance with the present disclosure.
FIG. 10 is a schematic diagram of a time slot in which part of symbols are used for sidelink transmission, in accordance with the present disclosure.

Broadcast transmission is supported in LTE-V2X. Unicast transmission and multicast transmission are introduced in NR-V2X. In the unicast transmission, there is only one receiving terminal. As shown in FIG. 7, the unicast transmission is performed between UE1 and UE2. In the multicast transmission, receiving terminals are all terminals in a communication group, or all terminals within a certain transmission distance. As shown in FIG. 8, UE1, UE2, UE3 and UE4 constitute a communication group, in which UE1 transmits data, and the remaining terminal devices in the group are all receiving terminals. In the broadcast transmission, a receiving terminal is any one terminal around a transmitting terminal. As shown in FIG. 9, UE1 is the transmitting terminal, and the remaining terminals around it, i.e., UE2 to UE6, are all receiving terminals.

Resource pools are introduced in the sidelink transmission system. The so-called resource pool is a set of transmission resources. Both transmission resources configured by the network and transmission resources autonomously selected by the terminal are resources in the resource pool. One or more resource pools may be configured in the way of preconfiguring or configuring by the network. The resource pool is classified as a transmitting resource pool or a receiving resource pool. The transmitting resource pool is a resource pool in which the transmission resources are used to transmit sidelink data. The receiving resource pool is a resource pool in which the transmission resources are used by the terminal to receive sidelink data.

In order to facilitate better understanding of the embodiments of the present disclosure, the structure of the time slot in NR-V2X related to the present disclosure will be described.

In NR-V2X, PSSCH and PSCCH associated with PSSCH are transmitted in the same time slot, and PSCCH occupies 2 or 3 time-domain symbols. In the time-domain resource allocation in NR-V2X, time slots are used as the allocation granularity. Sidelink start sidelink symbol (sl-startSLsymbol) and sidelink length sidelink symbols (sl-lengthSLsymbols) are used to configure the start point and the length of time-domain symbols used for sidelink transmission in a time slot, respectively. The last one of these time-domain symbols is used as a guard period (GP), and PSSCH and PSCCH can only use the remaining time-domain symbols. However, if a physical sidelink feedback channel (PSFCH) transmission resource is configured in a time slot, PSSCH and PSCCH cannot occupy a time-domain symbol used for PSFCH transmission, as well as an automatic gain control (Auto gain control, AGC) symbol and a GP symbol that are located before this symbol.

As shown in FIG. 10, sl-StartSymbol and sl-LengthSymbols are configured to be 3 and 11 respectively by the network, i.e., sl-StartSymbol=3 and sl-LengthSymbols=11, which means that 11 time-domain symbols starting from a symbol with an index 3 in a time slot can be used for sidelink transmission. There are PSFCH transmission resources in this time slot. PSFCH occupies a symbol 11 and a symbol 12, where the symbol 11 serves as an AGC symbol of PSFCH. A symbol 10 and a symbol 13 serve as GPs. Time-domain symbols available for PSSCH transmission are symbols 3 to 9. PSCCH occupies 3 time-domain symbols, that is, a symbol 4, a symbol 5, and a symbol 6. The symbol 3 usually serves as the AGC symbol.

In NR-V2X, PSCCH and PSSCH are initially presented in a time slot, and PSFCH may also be presented in the time slot, as shown in FIG. 11. It can be seen that the first orthogonal frequency-division multiplexing (OFDM) symbol in a time slot is always used for AGC. On the AGC symbol, a UE copies information transmitted on the second symbol. The last symbol in the time slot is reserved for receive/transmit switch, i.e., for the UE to switch from a transmit (or receive) state to a receive (or transmit) state. In the remaining OFDM symbols, PSCCH can occupy two or three OFDM symbols starting from the second sidelink symbol. In the frequency-domain, the quantity of physical resource blocks (PRBs) occupied by PSCCH is within a sub-band range of PSSCH. If the quantity of PRBs occupied by PSCCH is less than the size of one sub-channel of PSSCH, or the frequency-domain resources of PSSCH include multiple sub-channels, then PSCCH may be multiplexed with PSSCH in frequency division multiplexing on the OFDM symbols where PSCCH are located.

The demodulation reference signal (DMRS) of PSSCH in NR-V2X draws on the design of NR Uu interface, and uses multiple time-domain PSSCH DMRS patterns. The quantity of DMRS patterns available in a resource pool is related to the quantity of PSSCH symbols in the resource pool. For a certain quantity of PSSCH symbols (including the first AGC symbol) and a certain quantity of PSCCH symbols, the available DMRS patterns and the position of each DMRS symbol in the patterns are shown in Table 1. FIG. 12 shows a schematic diagram of the time-domain positions of 4 DMRS symbols in a case of 13 PSSCH symbols.

TABLE 1

| Quantity of PSSCH symbols (including the first AGC symbol) | Position of DMRS symbol (relative to position of the first AGC symbol) | | | | | |
|---|---|---|---|---|---|---|
| | The quantity of PSCCH symbols is 2 Quantity of DMRS symbols | | | The quantity of PSCCH symbols is 3 Quantity of DMRS symbols | | |
| | 2 | 3 | 4 | 2 | 3 | 4 |
| 6 | 1, 5 | | | 1, 5 | | |
| 7 | 1, 5 | | | 1, 5 | | |
| 8 | 1, 5 | | | 1, 5 | | |
| 9 | 3, 8 | 1, 4, 7 | | 4, 8 | 1, 4, 7 | |
| 10 | 3, 8 | 1, 4, 7 | | 4, 8 | 1, 4, 7 | |
| 11 | 3, 10 | 1, 5, 9 | 1, 4, 7, 10 | 4, 10 | 1, 5, 9 | 1, 4, 7, 10 |
| 12 | 3, 10 | 1, 5, 9 | 1, 4, 7, 10 | 4, 10 | 1, 5, 9 | 1, 4, 7, 10 |
| 3 | 3, 10 | 1, 6, 11 | 1, 4, 7, 10 | 4, 10 | 1, 6, 11 | 1, 4, 7, 10 |

If multiple time-domain DMRS patterns are configured in a resource pool, the specific time-domain DMRS pattern to be used is selected by a transmitting UE and indicated in the first-stage sidelink control information (SCI). Such a design allows high-speed moving UEs to select DMRS patterns with high-density to ensure the accuracy of channel estimation. While for low-speed moving UEs, DMRS patterns with low-density may be used to improve spectral efficiency.

The PSSCH DMRS sequence is generated in a manner almost identical to that of the PSCCH DMRS sequence. The only difference is that in the initialization formula $c_{init}$ of the pseudo-random sequence c(m), $$N_{ID} = \sum_{i=0}^{L-1} p_i \cdot 2^{L-1-i},$$

where $p_i$ is the i-th bit of the cyclical redundancy check (CRC) of PSCCH scheduling PSSCH; and L is the quantity of bits of the CRC of PSCCH, and L=24.

The physical downlink shared channel (PDSCH) and physical uplink shared channel (PUSCH) in NR support two types of frequency-domain DMRS patterns, namely DMRS frequency-domain type 1 and DMRS frequency-domain type 2. For each frequency-domain type, there are two different types of DMRS symbols, i.e., single DMRS symbol and dual DMRS symbol. DMRS frequency-domain type 1 with single symbol supports 4 DMRS ports, and DMRS frequency-domain type 2 with single symbol can support 6 DMRS ports. In a case of the dual DMRS symbol, the quantity of ports supportable by each DMRS frequency-domain type doubles. However, in NR-V2X, since PSSCH only needs to support at most two DMRS ports, only DMRS frequency-domain type 1 with single-symbol is supported. As shown in FIG. 13, resource element (RE) #0, RE #2, RE #4, RE #6, RE #8, and RE #10 each correspond to port 0/port 1.

In order to facilitate better understanding of the embodiments of the present disclosure, sidelink-based positioning related to the present disclosure will be described.

3GPP radio access network (RAN) has conducted a study on "NR positioning enhancement" and "scenarios and requirements for use cases of NR positioning within-coverage, within-partial-coverage and out-of-coverage". The study "scenarios and requirements for use cases of NR positioning within-coverage, within-partial-coverage and out-of-coverage" focuses on V2X and public safety use cases. Positioning accuracy requirements are formulated for Industrial Internet of Things (IIOT) usage in out-of-coverage scenarios. 3GPP needs to research and develop sidelink positioning solutions to support the use cases, scenarios and requirements determined in these activities.

In order to facilitate a better understanding of the embodiments of the present disclosure, the problems solved by the present disclosure will be described.

In order to achieve sidelink-based positioning, effective positioning reference signals need to be transmitted on the sidelink. However, in present technology, there may be sidelink channels and signals transmitted by a backward terminal on the sidelink. In this case, there is no effective solution for how to transmit positioning reference signals.

In light of the above problem, the present disclosure proposes a solution for transmitting reference signals used for positioning. A first terminal device transmits at least one reference signal and at least one sidelink channel to the second terminal device within a first time unit. The at least one reference signal is used for absolute positioning and/or relative positioning. That is to say, the embodiments of the present disclosure may realize an effective multiplexing of the reference signal used for the absolute positioning and/or the relative positioning and the at least one sidelink channel, reduce the impact of the transmission of the positioning reference signal on channel sensing, and provide effective positioning information.

The technical solutions of the present disclosure are described in detail in the following through specific embodiments.

Figure 14:
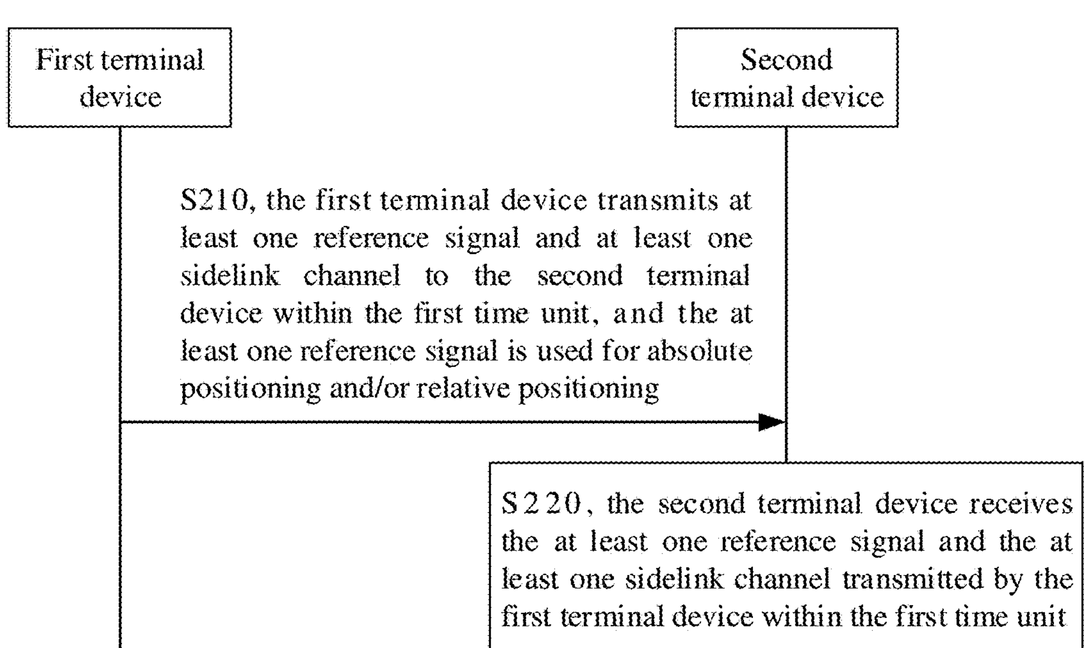
FIG. 14 is a schematic communication flowchart of a wireless communication method, in accordance with an embodiment of the present disclosure.

FIG. 14 is a schematic flowchart of a wireless communication method 200, in accordance with an embodiment of the present disclosure. As shown in FIG. 14, the wireless communication method 200 may include at least part of the following content.

In S210, a first terminal device transmits at least one reference signal and at least one sidelink channel to a second terminal device within a first time unit. The at least one reference signal is used for absolute positioning and/or relative positioning.

In S220, the second terminal device receives the at least one reference signal and the at least one sidelink channel transmitted by the first terminal device within the first time unit.

In the embodiments of the present disclosure, the first terminal device can transmit the at least one reference signal and the at least one sidelink channel within the first time unit. That is to say, the embodiments of the present disclosure may realize the effective multiplexing of the reference signal used for the absolute positioning and/or the relative positioning and the at least one sidelink channel, reduce the impact of the transmission of the positioning reference signal on channel sensing, and provide effective positioning information.

In the embodiments of the present disclosure, the at least one reference signal is used for absolute positioning and/or relative positioning. That is, after receiving the at least one reference signal, the second terminal device can perform the absolute positioning and/or the relative positioning based on the at least one reference signal.

In an example, each reference signal in the at least one reference signal is used for the absolute positioning, that is, the second terminal device can determine its global positioning coordinates based on the at least one reference signal.

In another example, each reference signal in the at least one reference signal is used for the relative positioning, that is, the second terminal device can determine its distance and/or direction relative to the first terminal device based on the at least one reference signal.

In yet another example, the at least one reference signal includes a reference signal 1 and a reference signal 2, in which the reference signal 1 is used for the absolute positioning and the reference signal 2 is used for the relative positioning. That is to say, the second terminal device can determine its global positioning coordinates based on the reference signal 1, and the second terminal device can determine its distance and/or direction relative to the first terminal device based on the reference signal 2.

In still yet another example, the at least one reference signal includes a reference signal 3, in which the reference signal 3 is used for the absolute positioning and the relative positioning. That is to say, the second terminal device can determine its global positioning coordinates based on the reference signal 3, and the second terminal device can determine its distance and/or direction relative to the first terminal device based on the reference signal 3.

In some embodiments, a time unit is a time slot or a subframe. That is to say, the first time unit may be a time slot or a subframe. Preferably, the first time unit is a time slot. In addition, other time units in the embodiments of the present disclosure may also be time slots or subframes. For example, a second time unit mentioned in subsequent embodiments may also be a time slot or a subframe. Preferably, the second time unit is a time slot. Of course, the time unit may also be a symbol, a frame, or a millisecond (ms), which is not limited in the present disclosure.

In some embodiments, the at least one sidelink channel includes, but is not limited to, at least one of the following: a PSSCH, a PSCCH, or a PSFCH.

In this embodiment of the present disclosure, the first terminal device may be a backward terminal, that is, a terminal that is compatible with protocols in previous version. Specifically, for the backward terminal, a resource pool used to transmit reference signals for positioning may be the same as a resource pool used to transmit PSCCH/PSSCH, that is, a reference signal used for positioning and the PSCCH/PSSCH may be transmitted in the same time slot.

In some embodiments, the first terminal device transmits redundant information to the second terminal device on a first resource in the first time unit. Specifically, transmitting the redundant information by the first terminal device can ensure transmitting bandwidth and transmitting period of the at least one sidelink channel (such as PSSCH) transmitted in the first time unit.

In some embodiments, in a case where a volume of data to be transmitted within the first time unit is less than a preset value, the first terminal device transmits the redundant information to the second terminal device on the first resource in the first time unit.

Specifically, for example, the preset value is defined in a protocol; alternatively, the preset value is configured by a network device; alternatively, the preset value is determined by the first terminal device; alternatively, the preset value is determined by the first terminal device and the second terminal device according to a negotiation therebetween.

In some embodiments, the first resource is determined by the first terminal device based on a transmission requirement of the at least one reference signal.

In some embodiments, a value range of the frequency-domain resources occupied by the at least one reference signal is defined in a protocol or pre-configured, or the value range of the frequency-domain resources occupied by the at least one reference signal is configured by a network device.

In some embodiments, a value range of a transmission period corresponding to the at least one reference signal is defined in a protocol or pre-configured, or the value range of the transmission period corresponding to the at least one reference signal is configured by a network device.

In some embodiments, a value range of the quantity of transmissions of a reference signal in each of transmission periods corresponding to the at least one reference signal is defined in a protocol or pre-configured, or the value range of the quantity of transmissions of a reference signal in each of the transmission periods corresponding to the at least one reference signal is configured by a network device.

In the embodiments of the present disclosure, if the first terminal device works in a Mode 1 resource pool (that is, a resource pool determined based on the above-mentioned first mode), and the base station is configured with positioning state report, then the first terminal device should report the positioning state to the base station when the first terminal device has accurate geographic location information. Alternatively, if the base station is configured with relative positioning requirement report, the first terminal device may report a relative positioning requirement to the base station when the first terminal device has a relative positioning requirement. The base station may allocate particular transmission resources (i.e., first resources) to the first terminal device, which allows the first terminal device to use some or all of the particular transmission resources to transmit the redundant information. For example, if transmitting data in a buffer with the lowest code rate by the first terminal device is still not enough to occupy all of the particular transmitting resources, the first terminal device is allowed to use additional resources to transmit the redundant information.

In the embodiments of the present disclosure, if the first terminal device works in a Mode 2 resource pool (that is, a resource pool determined based on the above-mentioned second mode). If a terminal with accurate geographical location information is allowed to transmit the redundant information in the resource pool, or a terminal with relative positioning requirements is allowed to transmit the redundant information in the resource pool, then when performing resource selection, the first terminal device may determine the size of frequency-domain resources to be occupied, the transmission period and the quantity of transmissions in each period, according to the transmission requirement of the positioning reference signal. Preferably, the value range of one or more of the resource size, the transmission period, and the quantity of transmissions in each period may be configured by the base station, pre-configured, or defined in a protocol. In a case where the first terminal device is to transmit the redundant information by using selected resources, if transmitting the data in a buffer with the lowest code rate by the first terminal device is still not enough to occupy all of the transmitting resources, the first terminal device is allowed to transmit the redundant information.

In the embodiments of the present disclosure, by allowing a terminal that meets the positioning signal transmission conditions to transmit the redundant information, the bandwidth, period, and quantity of the transmitted PSSCH DMRS can be guaranteed in a case where the terminal has no enough data to transmit, so as to guarantee the positioning accuracy.

It should be noted that the PSSCH DMRS may be a DMRS transmitted on the PSSCH.

In Embodiment 1, the at least one sidelink channel includes at least a PSSCH, and the at least one reference signal is a DMRS transmitted on the PSSCH. That is, some or all of the PSSCH DMRSs may serve as a reference signal for positioning.

In some implementations of the first embodiment, the PSSCH satisfies at least one of the following that:

- a channel bandwidth occupied by the PSSCH is not less than W;
- the PSSCH is transmitted periodically;
- the PSSCH is transmitted periodically, and the quantity of transmissions of the PSSCH in each period is not less than N;
- the PSSCH is transmitted in a mode of selecting resources in a resource pool, and a value of a sidelink resource reselection counter SL RESOURCE_ RESELECTION_COUNTER) is not less than C; or
- the PSSCH is transmitted on authorized resources configured by a network device.

W, N, and C are all positive integers; and the values of W, N, and C are defined in a protocol or pre-configured, or the values of W, N, and C are configured by a network device.

It should be noted that the mode of selecting resources in a resource pool may be the above-mentioned second mode. SL_RESOURCE_RESELECTION_COUNTER indicates the quantity of periods in which after re-selecting resources according to Mode 2, the first terminal device can use these resources. For example, if the value of W is not less than 24 PRBs and the PSSCH is transmitted periodically, a DMRS on the PSSCH may serve as a positioning reference signal.

In some implementations of Embodiment 1, the PSSCH carries first indication information, or the PSCCH used to schedule the PSSCH carries the first indication information. The first indication information is used to indicate that the at least one reference signal is used for the absolute positioning and/or the relative positioning. Specifically, the second terminal device may obtain the at least one reference signal based on the first indication information, and perform absolute the positioning and/or the relative positioning based on the at least one reference signal.

Specifically, for example, in the Embodiment 1, if a DMRS transmitted on the PSSCH is used for the absolute positioning, when having accurate geographical location information (for example, capable of receiving accurate GNSS signals), the first terminal device may indicate through the PSSCH that the DMRS on the PSSCH may be used for the absolute positioning, or may indicate through the PSCCH scheduling the PSSCH that the DMRS on the PSSCH may be used for the absolute positioning. For example, 1 bit in the PSCCH scheduling the PSSCH is used to indicate the DMRS on the scheduled PSSCH may be used for the absolute positioning. Alternatively, if the DMRS transmitted on the PSSCH is used for the relative positioning, the first terminal device may indicate through the PSSCH that the DMRS on the PSSCH may be used for the relative positioning, or the first terminal device may indicate through the PSCCH scheduling the PSSCH that the DMRS may be used for the relative positioning.

In Embodiment 2, the at least one sidelink channel includes at least a PSSCH, and the at least one reference signal includes $M_1$ first-type reference signals and $M_2$ second-type reference signals. $M_1$ and $M_2$ are both positive integers. The $M_1$ first-type reference signals are DMRSs transmitted on the PSSCH, and the $M_2$ second-type reference signals are positioning reference signals (PRSs) transmitted within a time-frequency range of the PSSCH. That is to say, in Embodiment 2, reference signals available for positioning include the DMRSs transmitted on the PSSCH, in addition, may further include other reference signals, such as the PRSs transmitted within the time-frequency range of the PSSCH.

In some implementations of Embodiment 2, the PSSCH satisfies at least one of the following that:

- a channel bandwidth occupied by the PSSCH is not less than W;
- the PSSCH is transmitted periodically;
- the PSSCH is transmitted periodically, and the quantity of transmissions of the PSSCH in each period is not less than N;
- the PSSCH is transmitted in a mode of selecting resources in a resource pool, and a value of a sidelink resource reselection counter (SL_RESOURCE_RESELECTION_COUNTER) is not less than C; or
- the PSSCH is transmitted on authorized resources configured by a network device.

W, N, and C are all positive integers; and the values of W, N, and C are defined in a protocol or pre-configured, or the values of W, N, and C are configured by a network device.

It should be noted that the mode of selecting resources in a resource pool may be in the above-mentioned second mode. SL RESOURCE_RESELECTION_COUNTER indicates the quantity of periods in which after re-selecting resources according to Mode 2, the first terminal device can use these resources. For example, if the value of W is not less than 24 PRBs and the PSSCH is transmitted periodically, the DMRS on the PSSCH may serve as a positioning reference signal.

In some implementations of Embodiment 2, the PSSCH carries first indication information, or the PSCCH used to schedule the PSSCH carries the first indication information. The first indication information is used to indicate that the at least one reference signals are used for the absolute positioning and/or the relative positioning. For example, 1 bit in the PSCCH scheduling the PSSCH is used to indicate that the scheduled PSSCH contains a reference signal for positioning. Specifically, the second terminal device may obtain the at least one reference signal based on the first indication information, and perform the absolute positioning and/or the relative positioning according to the at least one reference signal.

In Example 1 of Embodiment 2, the $M_2$ second-type reference signals are transmitted on OFDM symbols adjacent to one or more DMRS symbols of the PSSCH.

Figure 15:
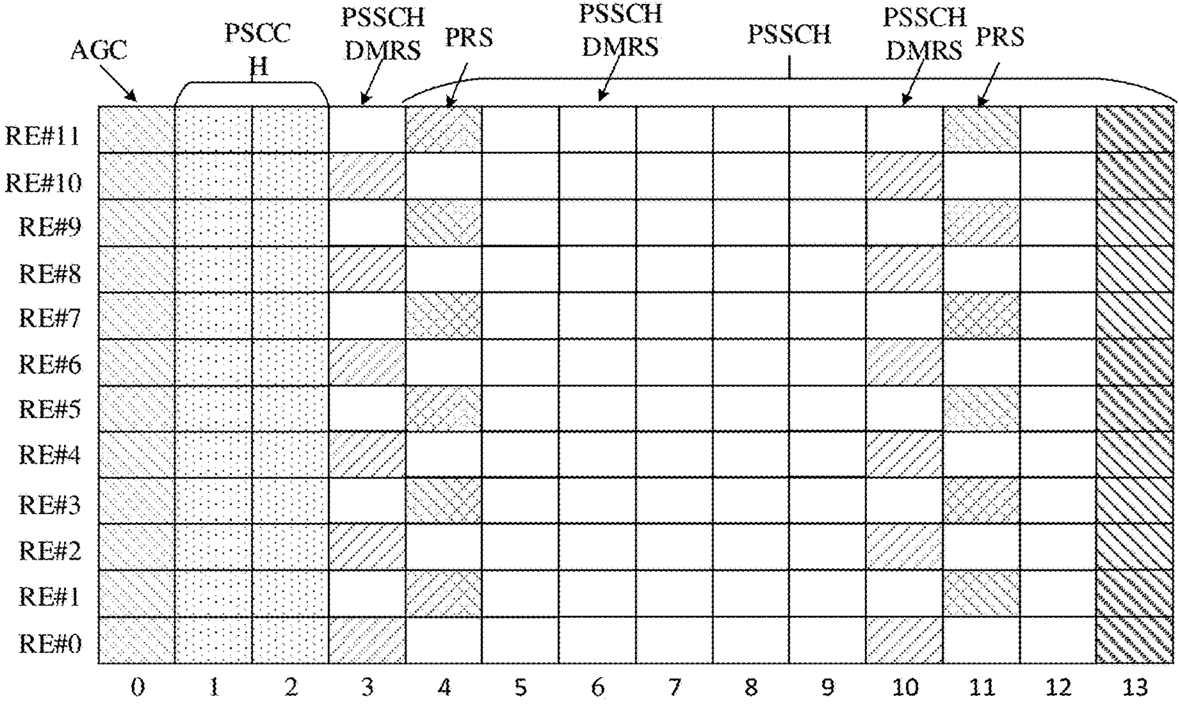
FIGS. 15 to 17 are each a schematic diagram of at least one reference signal, in accordance with an embodiment of the present disclosure.

Optionally, in Example 1, a PRS and a DMRS that are transmitted on adjacent symbols occupy different resource elements (REs). For example, a DMRS on a DMRS symbol occupies the odd-numbered REs, and a PRS on a symbol adjacent to the DMRS symbol occupies the even-numbered REs. An example is shown in FIG. 15.

Optionally, in Example 1, a DMRS sequence and a PRS sequence that are transmitted on adjacent symbols are the same. For example, a DMRS sequence transmitted on a OFDM symbol and a PRS sequence transmitted on a OFDM symbol adjacent to the OFDM symbol may be the same. In this way, the density of DMRSs used for positioning in the frequency-domain can be guaranteed, while DMRSs at DMRS positions determined according to the existing rules are not changed, thereby avoiding the impact on channel sensing of the backward terminal.

Optionally, in Example 1, in a case where the first terminal device performs rate matching on the PSSCH, the quantity of REs occupied by the PRS is ignored; and in a case where the first terminal performs resource mapping on modulation symbols of the PSSCH, modulation symbols of the PSSCH that are mapped to the REs of PRS should be punctured.

Optionally, in Example 1, the second terminal device may determine, according to corresponding indication information in PSCCH or PSSCH transmitted by the first terminal device, whether the PSSCH contains a reference signal for positioning. If the PSSCH contains a reference signal for positioning, the second terminal device can calculate the positioning information according to the DMRS on the PSSCH transmitted by the first terminal device and PRS additionally transmitted.

In Example 2 of Embodiment 2, the $M_2$ reference signals are transmitted on K OFDM symbols, and the K OFDM symbols are obtained by adjusting positions of REs occupied by DMRSs on the K DMRS symbols. The K DMRS symbols are different from DMRS symbols occupied by the $M_1$ first-type reference signals, where K is a positive integer.

Optionally, in Example 2, the DMRSs transmitted on the K DMRS symbols are not used for channel sensing; and/or the DMRSs transmitted on the PSCCH in the first time unit are used for the channel sensing.

Figure 16:
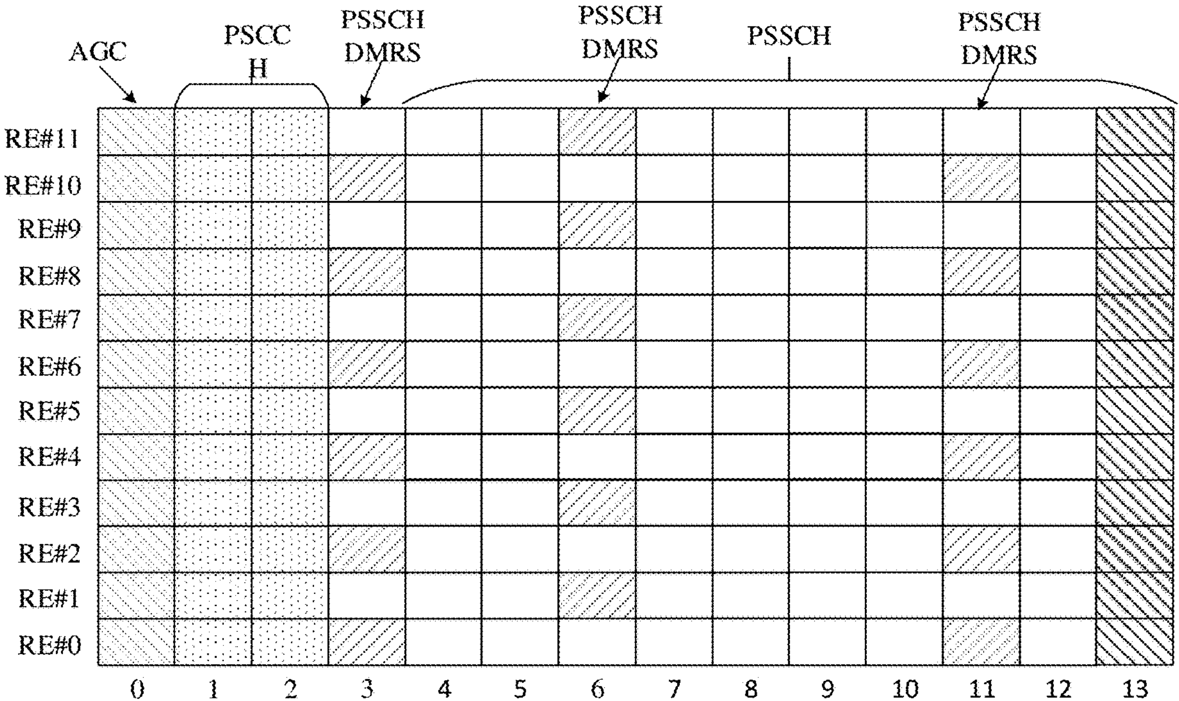

Specifically, in Example 2, if the first terminal device transmits the reference signal for the absolute positioning or the relative positioning, and multiple DMRS symbols are included in time-domain of PSSCH transmitted at the same time, the first terminal device may change positions of REs occupied by a DMRS on one or more DMRS symbols. The DMRS on the one or more DMRS symbols and a DMRS transmitted on other OFDM symbols together serve as positioning reference signals. For example, positions of REs occupied by a DMRS on the i-th DMRS symbol remain unchanged, and positions of REs occupied by the DMRS on the (i+1)-th DMRS symbol are incremented by one relative to positions of REs of the original DMRS. For example, as shown in FIG. 16, three DMRS symbols are transmitted in the PSSCH. In each DMRS symbol, REs occupied by a DMRS are RE #0, RE #2, RE #4, RE #6, RE #8 and RE #10 that are within a single PRB. Positions of REs occupied by DMRSs transmitted in the first DMRS symbol and the third DMRS symbol remain unchanged, and positions of REs occupied by the DMRS transmitted in the second DMRS symbol are incremented by one relative to the initial position, that is, the REs with changed positions are RE #1, RE #3, RE #5, RE #7, RE #9 and RE #11. Since the DMRS transmitted on the second DMRS symbol are changed, the backward terminal cannot use the DMRS for channel sensing. Preferably, in this case, the resource pool should be configured for performing channel sensing via the DMRS on the PSCCH, which can ensure the density of the DMRSs for positioning in the frequency-domain.

In Example 3 of Embodiment 2, the $M_2$ second-type reference signals are transmitted by using REs that are not occupied by DMRS in DMRS symbols occupied by the $M_1$ first-type reference signals.

Optionally, in Example 3, a DMRS sequence and a PRS sequence that are transmitted on the same DMRS symbol are the same.

Figure 17:
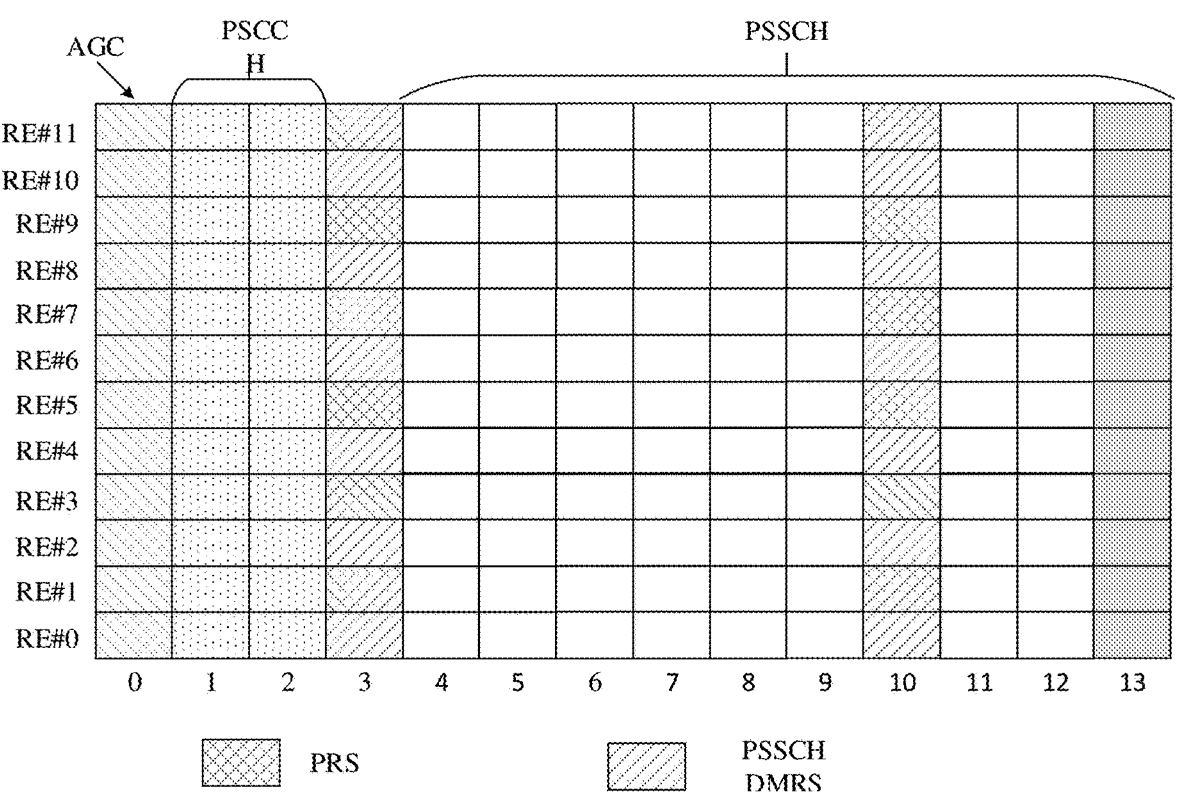

Specifically, in Example 3, if the first terminal device transmits a reference signal for the absolute positioning or the relative positioning, the first terminal device transmits additional PRS on REs, in one or more DMRS symbols of the PSSCH transmitted at the same time, that are not occupied by the DMRS of the PSSCH transmitted at the same time. The additional PRS and the DMRS transmitted on the OFDM symbol together serve as positioning reference signals. For example, as shown in FIG. 17, 3 DMRS symbols are transmitted in the PSSCH. On each DMRS symbol, REs occupied by DMRS are RE #0, RE #2, RE #4, RE #6, RE #8 and RE #10 that are in a single PRB. The first terminal device transmits the additional PRS on the REs not occupied by DMRS, i.e., RE #1, RE #3, RE #5, RE #7, RE #9 and RE #11.

Optionally, in Example 3, in a case where the first terminal device performs rate matching on the PSSCH, the quantity of REs occupied by the additionally transmitted PRS is ignored; and in a case where the first terminal device performs resource mapping on the modulation symbols of the PSSCH, modulation symbols of the PSSCH mapped to the REs of the PRS should be punctured.

In Example 3, a DMRS sequence transmitted on a DMRS symbol and a PRS sequence transmitted on the same DMRS symbol may be the same. In this way, the density of DMRSs used for positioning in the frequency-domain can be guaranteed, while DMRSs at DMRS positions determined according to the existing rules remain unchanged, thereby avoiding the impact on channel sensing of the backward terminal.

In some implementations of Embodiment 2, in a case of performing rate matching on the PSSCH, the first terminal device ignores the quantity of REs occupied by the $M_2$ second-type reference signals; and/or, in a case of performing rate matching on the PSSCH, the first terminal device punctures modulation symbols of the PSSCH that are mapped to the REs occupied by the $M_2$ second-type reference signals.

In Embodiment 3, the at least one sidelink channel includes at least a PSSCH, and the at least one reference signal includes $M_3$ third-type reference signals and $M_4$ fourth-type reference signals. $M_3$ and $M_4$ are both positive integers. The $M_3$ third-type reference signals are DMRSs transmitted on the PSSCH, and the $M_4$ fourth-type reference signals are PRSs transmitted out of the time-frequency range of the PSSCH. That is to say, in Embodiment 3, the reference signals available for positioning include DMRSs transmitted on the PSSCH, in addition, may further include other reference signals, such as the PRSs transmitted out of the time-frequency range of the PSSCH.

In some implementations of Embodiment 3, the PSSCH satisfies at least one of the following that:

a channel bandwidth occupied by the PSSCH is not less than W;

the PSSCH is transmitted periodically;

the PSSCH is transmitted periodically, and the quantity of transmissions of the PSSCH in each period is not less than N;

the PSSCH is transmitted in a mode of selecting resources in a resource pool, and a value of a sidelink resource reselection counter (SL_RESOURCE_RESELECTION_COUNTER) is not less than C; or the PSSCH is transmitted on authorized resources configured by a network device.

W, N, and C are all positive integers; and the values of W, N, and C are defined in a protocol or pre-configured, or the values of W, N, and C are configured by a network device.

It should be noted that the mode of selecting resources in a resource pool may be in the above-mentioned second mode. SL_RESOURCE_RESELECTION_COUNTER indicates the quantity of periods in which after re-selecting resources according to Mode 2, the first terminal device can use these resources. For example, if the value of W is not less than 24 PRBs and the PSSCH is transmitted periodically, a DMRS on the PSSCH may serve as a positioning reference signal.

In some implementations of Embodiment 3, the PSSCH carries first indication information, or the PSCCH used to schedule the PSSCH carries the first indication information. The first indication information is used to indicate that the at least one reference signal is used for the absolute positioning and/or the relative positioning. For example, 1 bit in the PSCCH scheduling the PSSCH is used to indicate that the scheduled PSSCH contains a reference signal for positioning. Specifically, the second terminal device may obtain the at least one reference signal based on the first indication information, and perform the absolute positioning and/or the relative positioning according to the at least one reference signal.

In Example 4 of Embodiment 3, the $M_4$ fourth-type reference signals are transmitted on the first OFDM symbol used for the sidelink in the first time unit.

Optionally, in Example 4, the $M_4$ fourth-type reference signals are transmitted by using REs at odd positions on the first OFDM symbol for sidelink in the first time unit, or the $M_4$ fourth-type reference signals are transmitted on REs at even positions on the first OFDM symbol for the sidelink in the first time unit.

Specifically, in Example 4, the PRS is located on the first OFDM symbol used for sidelink in a time slot, that is, the AGC symbol. The first terminal device can transmit a comb-shaped PRS on the AGC symbol, for example, the first terminal device transmits the PRS only on the odd-numbered or even-numbered REs, so that the second terminal device can perform AGC adjustment on the first half of the first OFDM symbol used for the sidelink, and perform positioning measurement on the second half of the first OFDM symbol.

In Example 5 of Embodiment 3, the $M_4$ fourth-type reference signals are transmitted on second resources in the first time unit. The second resources are distributed in at least one OFDM symbol in the first time unit with a first period.

Optionally, in Example 5, the at least one OFDM symbol does not overlap with OFDM symbols used for sidelink transmission in the first time unit, or the at least one OFDM symbol overlaps with at most one of the OFDM symbols that are used for the sidelink transmission in the first time unit.

Optionally, in Example 5, an index of the first OFDM symbol used for PRS transmission in the first time unit is not greater than an index of the first OFDM symbol used for sidelink in the first time unit.

Optionally, in Example 5, the first period is defined in a protocol or pre-configured, or the first period is configured by a network device; and/or the at least one OFDM symbol is defined in a protocol or pre-configured, or the at least one OFDM symbol is configured by a network device.

Figure 18:
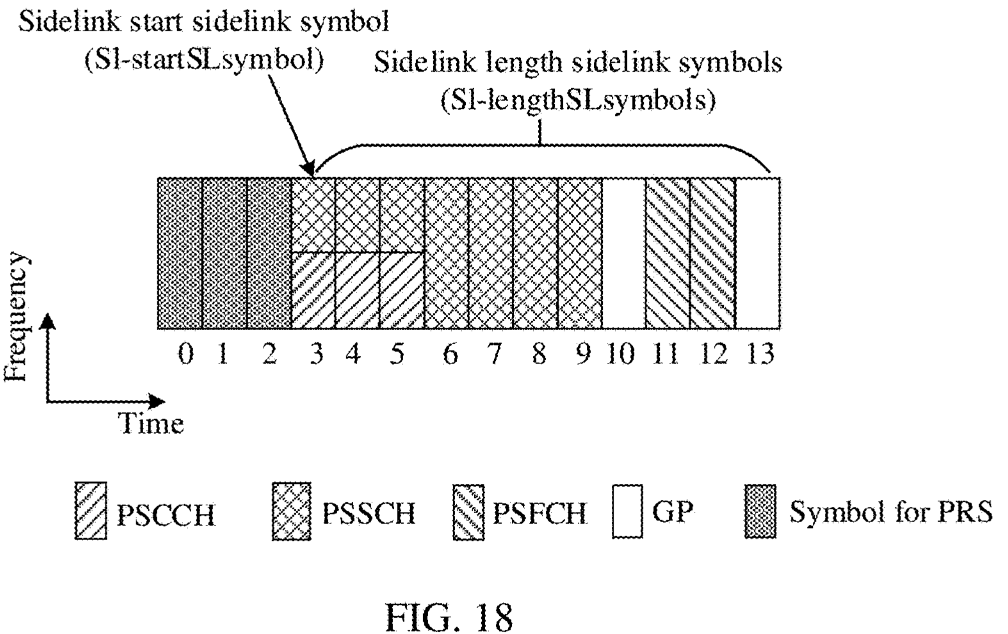
FIG. 18 is a schematic diagram showing that OFDM symbols used for PRS transmission are located before OFDM symbols for sidelink communication, in accordance with an embodiment of the present disclosure.

Specifically, the first time unit is a time slot, and resources for PRS transmission appear with a certain period on one or more OFDM symbols in the time slot. The one or more OFDM symbols do not overlap at all with the OFDM symbols configured to the backward terminal for sidelink transmission, or overlap with at most one of the OFDM symbols. Preferably, the OFDM symbols in the time slot and the period of the resources for the PRS transmission are configured or pre-configured by the base station, and an index of the first OFDM symbol available for the PRS transmission in a time slot is not greater than an index of the first OFDM symbol that is available for sidelink and that is configured by sl-startSLsymbol. For example, the sidelink PRS start sidelink symbols (sl-PRS-startSLsymbol) are used to configure the start point of OFDM symbols used for the PRS transmission, and the sidelink PRS length symbols (sl-PRS-LengthSymbols) are used to configure the quantity of OFDM symbols, consecutive from the sl-PRS-startSLsymbol, used for the PRS transmission. For example, as shown in FIG. 18, sl-PRS-startSLsymbol is 0, and sl-PRS-LengthSymbols is 3, i.e., sl-PRS-startSLsymbol=0, and sl-PRS-LengthSymbols=3.

Optionally, in Example 5, in a case where no transmission resources dedicated to PRS are configured in a second time unit in the resource pool, PSCCH and/or PSSCH are allowed to be transmitted on a OFDM symbol that is configured in the second time unit and available for PRS transmission.

Specifically, if a time slot in a resource pool is not configured with resources for PRS transmission, for OFDM symbols configured in the time slot and available for the PRS transmission, these OFDM symbols may be used for PSCCH transmission and/or PSSCH transmission of a terminal capable of identifying the configuration signaling. The backward terminal still uses OFDM symbols configured by the two parameters sl-startSLsymbol and sl-LengthSymbols to transmit the sidelink channel. For example, if the period of a dedicated PRS in a resource pool is 10 time slots with indexes #0, #10, #20, . . . , then in these time slots, the OFDM symbols configured by sl-PRS-startSLsymbol=0 and sl-PRS-startSLsymbols are used to transmit the dedicated PRS. In other time slots, these OFDM symbols are used to transmit PSCCH and/or PSSCH.

Optionally, in Example 5, the PRS is always transmitted together with the PSSCH, and the PRS and the PSSCH transmitted together with the PRS occupy the same PRBs.

Therefore, in the embodiments of the present disclosure, the first terminal device transmits at least one reference signal and at least one sidelink channel to the second terminal device within the first time unit. The at least one reference signal is used for absolute positioning and/or relative positioning. That is to say, the embodiments of the present disclosure may realize the effective multiplexing of the reference signal used for the absolute positioning and/or the relative positioning and the at least one sidelink channel, reduce the impact of the transmission of the positioning reference signal on channel sensing, and provide effective positioning information.

In the embodiments of the present disclosure, the reference signal used for positioning may be a DMRS on PSSCH, or the reference signal used for positioning may be a DMRS on the PSSCH and other reference signals transmitted additionally. The other signals transmitted additionally may be transmitted within the time-frequency range of the PSSCH, and occupy symbols where the DMRS is located or symbols adjacent to the DMRS. Alternatively, the other signals transmitted additionally are located on sidelink symbols that are located in the time slot and different from symbols used by the backward terminal. According to the method proposed in the present disclosure, effective multiplexing of the reference signals for positioning and the channels such as PSCCH, PSSCH, and PSFCH may be achieved, the impact of the transmission of positioning reference signals on channel sensing of the backward terminal is reduced, and effective positioning information is provided.

With reference to FIGS. 14 to 18, the method embodiments of the present disclosure are described in detail in the above. In the following, the device embodiments of the present disclosure will be described in detail with reference to FIGS. 19 and 20. It should be understood that the device embodiments correspond to the method embodiments, and the device embodiments may refer the similar description in the method embodiments.

FIG. 19 shows a schematic block diagram of a terminal device 300. The terminal device 300 may be a first terminal device. As shown in FIG. 19, the terminal device 300 includes a communication unit 310.

The communication unit 310 is configured to transmit at least one reference signal and at least one sidelink channel to a second terminal device within a first time unit. The at least one reference signal is used for absolute positioning and/or relative positioning.

In some embodiments, the communication unit 310 is further configured to transmit redundant information to the second terminal device on a first resource in the first time unit.

In some other embodiments, the communication unit 310 is specifically configured to:

transmit the redundant information to the second terminal device on the first resource in the first time unit, in a case where a volume of data to be transmitted within the first time unit is less than a preset value.

In some embodiments, the first resource is determined by the first terminal device based on a transmission requirement of the at least one reference signal.

In some embodiments, a value range of frequency-domain resources occupied by the at least one reference signal is defined in a protocol, pre-configured, or configured by a network device; and/or, a value range of transmission periods corresponding to the at least one reference signal is defined in a protocol, pre-configured, or configured by a network device; and/or, a value range of the quantity of transmissions of a reference signal in each of transmission periods corresponding to the at least one reference signal is defined by a protocol, pre-configured, or configured by a network device.

In some embodiments, the at least one sidelink channel includes at least a physical sidelink shared channel (PSSCH), and the at least one reference signal is a demodulation reference signal (DMRS) transmitted on the PSSCH.

In some embodiments, the at least one sidelink channel includes at least a PSSCH, and the at least one reference signal includes $M_1$ first-type reference signals and $M_2$ second-type reference signals, where $M_1$ and $M_2$ are both positive integers.

The $M_1$ first-type reference signals are DMRSs transmitted on the PSSCH, and the $M_2$ second-type reference signals are positioning reference signals (PRSs) transmitted within a time-frequency range of the PSSCH.

In some embodiments, the $M_2$ second-type reference signals are transmitted on orthogonal frequency division multiplexing (OFDM) symbols adjacent to one or more DMRS symbols of the PSSCH.

In some embodiments, a PRS and a DMRS that are transmitted on adjacent symbols occupy different resource elements (REs).

In some embodiments, a DMRS sequence and a PRS sequence that are transmitted on adjacent symbols are same.

In some embodiments, the $M_2$ reference signals are transmitted on K OFDM symbols, the K OFDM symbols are obtained by adjusting positions of REs occupied by DMRSs on the K DMRS symbols, and the K DMRS symbols are different from DMRS symbols occupied by the $M_1$ first-type reference signals, where K is a positive integer.

In some embodiments, DMRSs transmitted on the K DMRS symbols are not used for channel sensing; and/or, DMRSs transmitted on the physical sidelink control channel (PSCCH) in the first time unit are used for the channel sensing.

In some embodiments, the $M_2$ second-type reference signals are transmitted by using REs that are not occupied by the DMRS in DMRS symbols occupied by the $M_1$ first-type reference signals.

In some embodiments, a DMRS sequence and a PRS sequence that are transmitted on the same DMRS symbol are same.

In some embodiments, the terminal device further includes a processing unit 320.

The processing unit is configured to: ignore the quantity of REs occupied by the $M_2$ second-type reference signals, in a case where the first terminal device performs rate matching on the PSSCH; and/or, puncture modulation symbols of the PSSCH that are mapped to the REs occupied by the $M_2$ second-type reference signals, in a case where the first terminal device performs resource mapping on modulation symbols of the PSSCH.

In some embodiments, the at least one sidelink channel includes at least a PSSCH, and the at least one reference signal includes $M_3$ third-type reference signals and $M_4$ fourth-type reference signals, where $M_3$ and $M_4$ are both positive integers.

The $M_3$ third-type reference signals are DMRSs transmitted on the PSSCH, and the $M_4$ fourth-type reference signals are PRS transmitted out of a time-frequency range of the PSSCH.

In some embodiments, the $M_4$ fourth-type reference signals are transmitted on the first OFDM symbol used for sidelink in the first time unit.

In some embodiments, the $M_4$ fourth-type reference signals are transmitted by using REs at odd positions on the first OFDM symbol used for sidelink in the first time unit, or the $M_4$ fourth-type reference signals are transmitted by using REs at even positions on the first OFDM symbol used for the sidelink in the first time unit.

In some embodiments, the $M_4$ fourth-type reference signals are transmitted on second resources in the first time unit, and the second resources are distributed in at least one OFDM symbol in the first time unit with a first period.

In some embodiments, the at least one OFDM symbol does not overlap with OFDM symbols used for sidelink transmission in the first time unit, or the at least one OFDM symbol overlaps with at most one of the OFDM symbols that are used for sidelink transmission in the first time unit.

In some embodiments, an index of the first OFDM symbol used for PRS transmission in the first time unit is not greater than an index of the first OFDM symbol used for sidelink in the first time unit.

In some embodiments, the first period is defined in a protocol, pre-configured, or configured by a network device; and/or the at least one OFDM symbol is defined in a protocol, pre-configured, or configured by a network device.

In some embodiments, in a case where no transmission resources dedicated to PRS are configured in a second time unit in a resource pool, PSCCH and/or PSSCH are allowed to be transmitted on a OFDM symbol that is configured in the second time unit and available for PRS transmission.

In some embodiments, the PSSCH satisfies at least one of the following that:

a channel bandwidth occupied by the PSSCH is not less than W;

the PSSCH is transmitted periodically;

the PSSCH is transmitted periodically, and the quantity of transmissions of the PSSCH in each period is not less than N;

the PSSCH is transmitted of selecting resources in a resource pool, and a value of a sidelink resource reselection counter is not less than C; or the PSSCH is transmitted on authorized resources configured by a network device.

W, N, and C are all positive integers; values of W, N, and C are defined in a protocol, pre-configured, or configured by a network device.

In some embodiments, the PSSCH carries first indication information, or a PSCCH used to schedule the PSSCH carries the first indication information, where the first indication information is used to indicate that the at least one reference signal is used for the absolute positioning and/or the relative positioning.

In some embodiments, the at least one sidelink channel includes at least one of the following: a PSSCH, a PSCCH, or a physical sidelink feedback channel (PSFCH).

In some embodiments, the time unit is a time slot or a subframe.

In some embodiments, the above-mentioned communication unit may be a communication interface or a transceiver, or an input/output interface of a communication chip or a system on chip. The processing unit may include one or more processors.

It should be understood that the terminal device 300 according to embodiments of the present disclosure may correspond to the first terminal device in the method embodiments of the present disclosure, and the above-mentioned and other operations and/or functions of various units in the terminal device 300 are for implementing corresponding processes of the first terminal device in the method 200 shown in FIGS. 14 to 18, and will not be repeated herein for brevity.

FIG. 20 shows a schematic block diagram of a terminal device 400. The terminal device 400 may be a second terminal device. As shown in FIG. 20, the terminal device 400 includes a communication unit 410.

The a communication unit 410 is configured to receive at least one reference signal and at least one sidelink channel transmitted by the first terminal device within the first time unit. The at least one reference signal is used for absolute positioning and/or relative positioning.

In some embodiments, the communication unit 410 is further configured to receive redundant information transmitted by the first terminal device on a first resource in the first time unit.

In some embodiments, the redundant information is transmitted by the first terminal device in a case where a volume of data to be transmitted within the first time unit is less than a preset value.

In some embodiments, the first resource is determined by the first terminal device based on a transmission requirement of the at least one reference signal.

In some embodiments, a value range of frequency-domain resources occupied by the at least one reference signal is defined in a protocol, pre-configured, or configured by a network device; and/or, a value range of transmission periods corresponding to the at least one reference signal is defined in a protocol, pre-configured, or configured by a network device; and/or, a value range of the quantity of transmissions of a reference signal in each of transmission periods corresponding to the at least one reference signal is defined by a protocol, pre-configured, or configured by a network device.

In some embodiments, the at least one sidelink channel includes at least a physical sidelink shared channel (PSSCH), and the at least one reference signal is a demodulation reference signal (DMRS) transmitted on the PSSCH.

In some embodiments, the at least one sidelink channel includes at least a PSSCH, and the at least one reference signal includes $M_1$ first-type reference signals and $M_2$ second-type reference signals, where $M_1$ and $M_2$ are both positive integers.

The $M_1$ first-type reference signals are DMRSs transmitted on the PSSCH, and the $M_2$ second-type reference signals are positioning reference signals (PRSs) transmitted within a time-frequency range of the PSSCH.

In some embodiments, the $M_2$ second-type reference signals are transmitted on orthogonal frequency division multiplexing (OFDM) symbols adjacent to one or more DMRS symbols of the PSSCH.

In some embodiments, a PRS and a DMRS that are transmitted on adjacent symbols occupy different resource elements (REs).

In some embodiments, a DMRS sequence and a PRS sequence that are transmitted on adjacent symbols are same.

In some embodiments, the $M_2$ reference signals are transmitted on K OFDM symbols, the K OFDM symbols are obtained by adjusting positions of REs occupied by DMRSs on the K DMRS symbols, and the K DMRS symbols are different from DMRS symbols occupied by the $M_1$ first-type reference signals, where K is a positive integer.

In some embodiments, DMRSs transmitted on the K DMRS symbols are not used for channel sensing; and/or, DMRSs transmitted on the physical sidelink control channel (PSCCH) in the first time unit are used for channel sensing.

In some embodiments, the $M_2$ second-type reference signals are transmitted by using REs that are not occupied by DMRS in DMRS symbols occupied by the $M_1$ first-type reference signals.

In some embodiments, a DMRS sequence and a PRS sequence that are transmitted on the same DMRS symbol are same.

In some embodiments, in a case where rate matching is performed on the PSSCH, the quantity of REs occupied by the $M_2$ second-type reference signals is ignored; and/or, in a case where resource mapping is performed on modulation symbols of the PSSCH, modulation symbols of the PSSCH that are mapped to the REs occupied by the $M_2$ second-type reference signals are punctured.

In some embodiments, the at least one sidelink channel includes at least a PSSCH, and the at least one reference signal includes $M_3$ third-type reference signals and $M_4$ fourth-type reference signals, where $M_3$ and $M_4$ are both positive integers.

The $M_3$ third-type reference signals are DMRSs transmitted on the PSSCH, and the $M_4$ fourth-type reference signals are PRS transmitted out of a time-frequency range of the PSSCH.

In some embodiments, the $M_4$ fourth-type reference signals are transmitted on the first OFDM symbol used for sidelink in the first time unit.

In some embodiments, the $M_4$ fourth-type reference signals are transmitted by using REs at odd positions on the first OFDM symbol used for sidelink in the first time unit, or the $M_4$ fourth-type reference signals are transmitted by using REs at even positions on the first OFDM symbol used for the sidelink in the first time unit.

In some embodiments, the $M_4$ fourth-type reference signals are transmitted on second resources in the first time unit, and the second resources are distributed in at least one OFDM symbol in the first time unit with a first period.

In some embodiments, the at least one OFDM symbol does not overlap with OFDM symbols used for sidelink transmission in the first time unit, or the at least one OFDM symbol overlaps with at most one of the OFDM symbols that are used for sidelink transmission in the first time unit.

In some embodiments, an index of the first OFDM symbol used for PRS transmission in the first time unit is not greater than an index of the first OFDM symbol used for sidelink in the first time unit.

In some embodiments, the first period is defined in a protocol, pre-configured, or configured by a network device; and/or the at least one OFDM symbol is defined in a protocol, pre-configured, or configured by a network device.

In some embodiments, in a case where no transmission resources dedicated to PRS are configured in a second time unit in the resource pool, PSCCH and/or PSSCH are allowed to be transmitted on a OFDM symbol that is configured in the second time unit and available for PRS transmission.

In some embodiments, the PSSCH satisfies at least one of the following that:

a channel bandwidth occupied by the PSSCH is not less than W;

the PSSCH is transmitted periodically;

the PSSCH is transmitted periodically, and the quantity of transmissions of the PSSCH in each period is not less than N;

the PSSCH is transmitted of selecting resources in a resource pool, and a value of a sidelink resource reselection counter is not less than C; or the PSSCH is transmitted on authorized resources configured by a network device.

W, N, and C are all positive integers; values of W, N, and C are defined in a protocol, pre-configured, or configured by a network device.

In some embodiments, the PSSCH carries first indication information, or a PSCCH used to schedule the PSSCH carries the first indication information, where the first indication information is used to indicate that the at least one reference signal is used for the absolute positioning and/or the relative positioning.

In some embodiments, the at least one sidelink channel includes at least one of the following: a PSSCH, a PSCCH, or a physical sidelink feedback channel (PSFCH).

In some embodiments, the time unit is a time slot or a subframe.

In some embodiments, the above-mentioned communication unit may be a communication interface or a transceiver, or an input/output interface of a communication chip or a system on chip.

It should be understood that the terminal device 400 according to embodiments of the present disclosure may correspond to the second terminal device in the method embodiments of the present disclosure, and the above-mentioned and other operations and/or functions of various units in the terminal device 400 are for implementing corresponding processes of the second terminal device in the method 200 shown in FIGS. 14 to 18, and will not be repeated herein for brevity.

FIG. 21 is a schematic structure diagram of a communication device 500 in accordance with an embodiment of the present disclosure. The communication device 500 shown in FIG. 21 includes a processor 510, which may call and run a computer program from a memory to implement the methods according to the embodiments of the present disclosure.

In some embodiments, as shown in FIG. 21, the communication device 500 may further include a memory 520. The processor 510 may call and run a computer program from the memory 520 to implement the methods in the embodiments of the present disclosure.

The memory 520 may be a separate device independent of the processor 510, or may be integrated in the processor 510.

In some embodiments, as shown in FIG. 21, the communication device 500 may further include a transceiver 530, and the processor 510 may control the transceiver 530 to communicate with another device. Specifically, the transceiver 530 may send information or data to another device or receive information or data sent by another device.

The transceiver 530 may include a transmitter and a receiver. The transceiver 530 may further include an antenna, and the antenna may be singular or plural in quantity, In some embodiments, the communication device 500 may specifically be the first terminal device according to the embodiments of the present disclosure, and the communication device 500 may implement corresponding processes implemented by the first terminal device in various methods in the embodiments of the present disclosure, which will not be repeated here for brevity.

In some embodiments, the communication device 500 may be specifically the second terminal device in the embodiments of the present disclosure, and the communication device 500 may implement corresponding processes implemented by the second terminal device in various methods in the embodiments of the present disclosure, which will not be repeated here for brevity.

Figure 22:
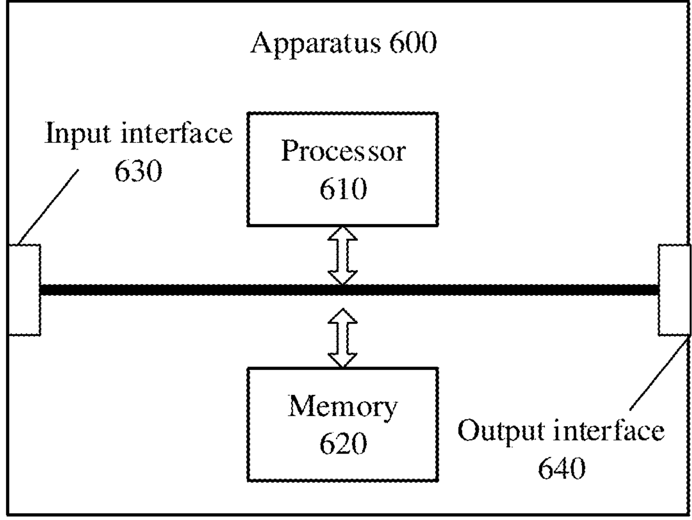
FIG. 22 is a schematic block diagram of an apparatus, in accordance with an embodiment of the present disclosure.

FIG. 22 is a schematic structural diagram of an apparatus in accordance with an embodiment of the present disclosure. The apparatus 600 shown in FIG. 22 includes a processor 610. The processor 610 may call and run a computer program from a memory to implement the methods in the embodiments of the present disclosure.

In some embodiments, as shown in FIG. 22, the apparatus 600 may further include a memory 620. The processor 610 may call and run a computer program from the memory 620 to implement the methods in the embodiments of the present disclosure.

The memory 620 may be a separate device independent of the processor 610, or may be integrated in the processor 610.

In some embodiments, the apparatus 600 may further include an input interface 630. The processor 610 may communicate with another device or chip by controlling the input interface 630. Specifically, the processor 610 may acquire information or data sent by another device or chip.

In some embodiments, the apparatus 600 may further include an output interface 640. The processor 610 may communicate with another device or chip by controlling the output interface 640. Specifically, the processor 610 may output information or data to another device or chip.

In some embodiments, the apparatus may be applied to the first terminal device in the embodiments of the present disclosure, and the apparatus may implement corresponding processes implemented by the first terminal device in various methods in the embodiments of the present disclosure, which will not be repeated here for brevity.

In some embodiments, the apparatus may be applied to the second terminal device in the embodiments of the present disclosure, and the apparatus may implement corresponding processes implemented by the second terminal device in various methods in the embodiments of the present disclosure, which will not be repeated here for brevity.

In some embodiments, the apparatus mentioned in the embodiments of the present disclosure may also be a chip. For example, it may be a system-level chip, a system chip, a chip system, or a system on chip.

Figure 23:
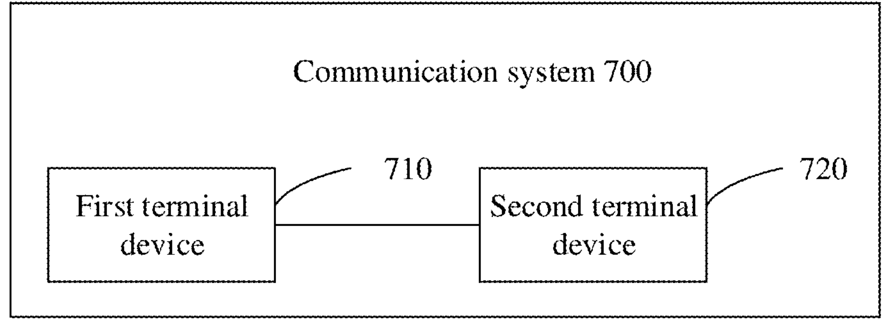
FIG. 23 is a schematic block diagram of a communication system, in accordance with an embodiment of the present disclosure.

FIG. 23 is a schematic block diagram of a communication system 700 in accordance with an embodiment of the present disclosure. As shown in FIG. 23, the communication system 700 includes a first terminal device 710 and a second terminal device 720.

The first terminal device 710 may be configured to implement the corresponding functions implemented by the first terminal device in the above-mentioned methods, and the second terminal device 720 may be configured to implement the corresponding functions implemented by the second terminal device in the above-mentioned methods, which will not be repeated herein for brevity.

It should be understood that the processor in the embodiments of the present disclosure may be an integrated circuit chip with a capability for processing signals. In an implementation process, various steps of the method embodiments described above may be completed through an integrated logic circuit of hardware in a processor or instructions in a form of software. The above processor may be a general purpose processor, a digital signal processor (DSP), an application specific integrated circuit (ASIC), a field programmable gate array (FPGA), or another programmable logic device, a discrete gate or transistor logic device, or a discrete hardware component. The processor may implement various methods, steps, and logic block diagrams disclosed in the embodiments of the present disclosure. The general purpose processor may be a microprocessor or the processor may be any conventional processor. The steps of the methods disclosed in connection with the embodiments of the present disclosure may be directly embodied by execution of a hardware decoding processor, or by execution of a combination of hardware and software modules in a decoding processor. The software modules may be located in a storage medium commonly used in the art, such as a random access memory, a flash memory, a read-only memory, a programmable read-only memory or an electrically erasable programmable memory, or a register. The storage medium is located in a memory, and the processor reads information in the memory and completes the steps of the above methods in combination with hardware of the processor.

It will be appreciated that the memory in the embodiments of the present disclosure may be a transitory memory or a non-transitory memory, or may include both transitory and non-transitory memories. The non-transitory memory may be a read-only memory (ROM), a programmable ROM (PROM), an erasable PROM (EPROM), an electrically EPROM (EEPROM), or a flash memory. The transitory memory may be a random access memory (RAM) which serves as an external cache. As an example, but not as a limitation, many forms of RAMs are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM). It should be noted that the memories of the systems and methods described herein are intended to include, but are not limited to, these and any other suitable types of memories.

It should be understood that the above memories are described as examples rather than limitations. For example, the memory in the embodiments of the present disclosure may be a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), or a direct Rambus RAM (DR RAM). That is to say, the memories in the embodiments of the present disclosure are intended to include, but are not limited to, these and any other suitable types of memories.

An embodiment of the present disclosure provides a non-transitory computer-readable storage medium, configured to store a computer program.

In some embodiments, the non-transitory computer-readable storage medium may be applied to the first terminal device in the embodiments of the present disclosure, and the computer program causes a computer to perform corresponding processes implemented by the first terminal device in various methods in the embodiments of the present disclosure, which will not be repeated here for brevity.

In some embodiments, the non-transitory computer-readable storage medium may be applied in the second terminal device of the embodiments of the present disclosure, and the computer program causes a computer to perform corresponding processes implemented by the second terminal device in various methods in the embodiments of the present disclosure, which will not be repeated here for brevity.

An embodiment of the present disclosure provides a computer program product, including computer program instructions.

In some embodiments, the computer program product may be applied to the first terminal device in the embodiments of the present disclosure, and the computer program instructions cause a computer to perform corresponding processes implemented by the first terminal device in various methods in the embodiments of the present disclosure, which will not be repeated here for brevity.

In some embodiments, the computer program product may be applied to the second terminal device in the embodiments of the present disclosure, and the computer program instructions cause a computer to perform corresponding processes implemented by the second terminal device in various methods in the embodiments of the present disclosure, which will not be repeated here for brevity.

An embodiment of the present disclosure provides a computer program.

In some embodiments, the computer program may be applied to the first terminal device in the embodiments of the present disclosure. When running on a computer, the computer program causes the computer to perform corresponding processes implemented by the first terminal device in various methods in the embodiments of the present disclosure, which will not be repeated here for brevity.

In some embodiments, the computer program may be applied to the second terminal device in the embodiments of the present disclosure. When running on a computer, the computer program causes the computer to perform corresponding processes implemented by the second terminal device in various methods in the embodiments of the present disclosure, which will not be repeated here for brevity.

Those of ordinary skills in the art will recognize that units and algorithm steps of various examples described in connection with the embodiments disclosed herein may be implemented in electronic hardware, or a combination of computer software and electronic hardware. Whether these functions are implemented in a form of hardware or software depends on a specific application and a design constraint of a technical solution. Those skilled in the art may use different methods to implement the described functions for each specific application, but such implementation should not be considered to be beyond the scope of the present disclosure.

Those skilled in the art may clearly understand that for convenience and conciseness of description, specific working processes of the systems, devices/apparatuses, and units described above may refer to corresponding processes in the aforementioned method embodiments, and details will not be repeated here.

In several embodiments according to the present disclosure, it should be understood that the disclosed systems, devices/apparatuses, and methods may be implemented in other ways. For example, the device/apparatus embodiments described above are only illustrative, for example, the division of the units is only a logical function division, and there may be other division manners in actual implementation. For example, multiple units or components may be combined or integrated into another system, or some features may be ignored or not executed. In addition, coupling or direct coupling or communication connection shown or discussed between each other, which may be indirect coupling or communication connection between the devices or units via some interfaces, may be electrical, mechanical, or in other forms.

The units described as separate components may be or may be not physically separated, and the component shown as a unit may be or may be not a physical unit, i.e., it may be located in one place or may be distributed on multiple network units. Some or all of units may be selected according to actual needs to achieve purposes of technical solutions of the embodiments.

In addition, various functional units in various embodiments of the present disclosure may be integrated in one processing unit, or various units may be physically present separately, or two or more units may be integrated in one unit.

The functions, if implemented in a form of software functional units and sold or used as an independent product, may be stored in a computer-readable storage medium. For such understanding, the technical solutions of the present disclosure, in essence, or the part which contributes to the prior art, or part of the technical solutions, may be embodied in the form of a software product, in which the computer software product is stored in one storage medium including a number of instructions for causing one computer device (which may be a personal computer, a server, or a network device) to perform all or some of the steps of the methods according to various embodiments of the present disclosure. The aforementioned storage media includes various media capable of storing program codes, such as a U disk, a mobile hard disk, a read-only memory (ROM), a random access memory (RAM), a magnetic disk, an optical disk, and the like.

The foregoing are merely specific embodiments of the present disclosure, but the protection scope of the present disclosure is not limited thereto. Any person skilled in the art may readily conceive variations or substitutions within the technical scope disclosed by the present disclosure, which should be included within the protection scope of the present disclosure. Therefore, the protection scope of the present disclosure shall be subject to the protection scope of the claims.

What is claimed is:

1. A wireless communication method, comprising:

transmitting, by a first terminal device, at least one reference signal and at least one sidelink channel to a second terminal device within a first time unit, wherein the at least one reference signal is used for absolute positioning, relative positioning, or both absolute positioning and relative positioning:

wherein the method further comprises:

in a case where a volume of data to be transmitted within the first time unit is less than a preset value, transmitting, by the first terminal device, redundant information to the second terminal device on a first resource in the first time unit.

2. The method according to claim 1, wherein the first resource is determined by the first terminal device based on a transmission requirement of the at least one reference signal.

3. The method according to claim 2, wherein a value range of frequency-domain resources occupied by the at least one reference signal is defined in a protocol, pre-configured, or configured by a network device; or, a value range of transmission periods corresponding to the at least one reference signal is defined in a protocol, pre-configured, or configured by a network device; or, a value range of a quantity of transmissions of a reference signal in each of transmission periods corresponding to the at least one reference signal is defined in a protocol, pre-configured, or configured by a network device.

4. The method according to claim 1, wherein the at least one sidelink channel includes at least a physical sidelink shared channel (PSSCH), and the at least one reference signal is a demodulation reference signal (DMRS) transmitted on the PSSCH.

5. The method according to claim 4, wherein the PSSCH carries first indication information; wherein the first indication information is used to indicate that the at least one reference signal is used for the absolute positioning, the relative positioning, or both the absolute positioning and the relative positioning.

6. The method according to claim 1, wherein the at least one sidelink channel includes at least a PSSCH, and the at least one reference signal includes $M_1$ first-type reference signals and $M_2$ second-type reference signals, $M_1$ and $M_2$ being both positive integers; wherein the $M_1$ first-type reference signals are DMRSs transmitted on the PSSCH, and the $M_2$ second-type reference signals are positioning reference signals (PRSs) transmitted within a time-frequency range of the PSSCH.

7. The method according to claim 6, wherein the $M_2$ second-type reference signals are transmitted on orthogonal frequency division multiplexing (OFDM) symbols adjacent to one or more DMRS symbols of the PSSCH.

8. The method according to claim 1, wherein the at least one sidelink channel includes at least one of following: a PSSCH, a PSCCH.

9. The method according to claim 1, wherein a time unit is a time slot.

10. A first terminal device, comprising:

a transceiver;

a memory, configured to store a computer program; and a processor, configured to call and run the computer program stored in the memory; wherein the transceiver is configured to perform:

transmitting at least one reference signal and at least one sidelink channel to a second terminal device within a first time unit, wherein the at least one reference signal is used for absolute positioning, relative positioning, or both absolute positioning and relative positioning;

wherein the transceiver is configured to further perform:

in a case where a volume of data to be transmitted within the first time unit is less than a preset value, transmitting redundant information to the second terminal device on a first resource in the first time unit.

11. The first terminal device according to claim 10, wherein the first resource is determined by the first terminal device based on a transmission requirement of the at least one reference signal.

12. The first terminal device according to claim 11, wherein a value range of frequency-domain resources occupied by the at least one reference signal is defined in a protocol, pre-configured, or configured by a network device; or, a value range of transmission periods corresponding to the at least one reference signal is defined in a protocol, pre-configured, or configured by a network device; or, a value range of a quantity of transmissions of a reference signal in each of transmission periods corresponding to the at least one reference signal is defined in a protocol, pre-configured, or configured by a network device.

13. The first terminal device according to claim 10, wherein the at least one sidelink channel includes at least a physical sidelink shared channel (PSSCH), and the at least one reference signal is a demodulation reference signal (DMRS) transmitted on the PSSCH.

14. The first terminal device according to claim 13, wherein the PSSCH carries first indication information; wherein the first indication information is used to indicate that the at least one reference signal is used for the absolute positioning, the relative positioning, or both the absolute positioning and the relative positioning.

15. The first terminal device according to claim 10, wherein the at least one sidelink channel includes at least a PSSCH, and the at least one reference signal includes $M_1$ first-type reference signals and $M_2$ second-type reference signals, $M_1$ and $M_2$ being both positive integers; wherein the $M_1$ first-type reference signals are DMRSs transmitted on the PSSCH, and the $M_2$ second-type reference signals are positioning reference signals (PRSs) transmitted within a time-frequency range of the PSSCH.

16. The first terminal device according to claim 15, wherein the $M_2$ second-type reference signals are transmitted on orthogonal frequency division multiplexing (OFDM) symbols adjacent to one or more DMRS symbols of the PSSCH.

17. The first terminal device according to claim 10, wherein the at least one sidelink channel includes at least one of following: a PSSCH, a PSCCH.

18. A second terminal device, comprising:

a transceiver;

a memory, configured to store a computer program; and a processor, configured to call and run the computer program stored in the memory; wherein the transceiver is configured to perform:

receiving at least one reference signal and at least one sidelink channel transmitted by a first terminal device within a first time unit; wherein the at least one reference signal is used for absolute positioning, relative positioning, or both absolute positioning and relative positioning;

wherein the transceiver is configured to further perform:

receiving redundant information transmitted by the first terminal device on a first resource in the first time unit; wherein the redundant information is transmitted by the first terminal device in a case where a volume of data to be transmitted within the first time unit is less than a preset value.

19. The second terminal device according to claim 18, wherein the first resource is determined by the first terminal device based on a transmission requirement of the at least one reference signal.

20. The second terminal device according to claim 19, wherein a value range of frequency-domain resources occupied by the at least one reference signal is defined in a protocol, pre-configured, or configured by a network device; or, a value range of transmission periods corresponding to the at least one reference signal is defined in a protocol, pre-configured, or configured by a network device; or, a value range of a quantity of transmissions of a reference signal in each of transmission periods corresponding to the at least one reference signal is defined in a protocol, pre-configured, or configured by a network device.

* * * * *